US 9,323,340 B2

(12) United States Patent
Pantel

(10) Patent No.: US 9,323,340 B2
(45) Date of Patent: Apr. 26, 2016

(54) METHOD FOR GESTURE CONTROL

(71) Applicant: Lothar Pantel, Neckargemuend (DE)

(72) Inventor: Lothar Pantel, Neckargemuend (DE)

(73) Assignee: inodyn NewMedia GmbH, Neckargemuend (DE)

( * ) Notice: Subject to any disclaimer, the term of this patent is extended or adjusted under 35 U.S.C. 154(b) by 76 days.

(21) Appl. No.: 14/261,385

(22) Filed: Apr. 24, 2014

(65) Prior Publication Data
US 2014/0320434 A1    Oct. 30, 2014

(30) Foreign Application Priority Data
Apr. 26, 2013    (DE) .................... 10 2013 007 250

(51) Int. Cl.
*G06F 3/01* (2006.01)
*G06F 3/041* (2006.01)
*G06F 3/0488* (2013.01)
*G06F 1/16* (2006.01)

(52) U.S. Cl.
CPC .............. *G06F 3/017* (2013.01); *G06F 3/0416* (2013.01); *G06F 3/04883* (2013.01); *G06F 3/04886* (2013.01); *G06F 1/1626* (2013.01); *G06F 2200/1637* (2013.01)

(58) Field of Classification Search
CPC . G06F 3/017; G06F 3/04886; G06F 3/04883; G06F 3/0416; G06F 1/1626; G06F 2200/1637
See application file for complete search history.

(56) References Cited

U.S. PATENT DOCUMENTS

| 7,671,756 | B2 | 3/2010 | Herz et al. |
| 8,125,312 | B2 | 2/2012 | Orr |
| 2009/0189878 | A1 | 7/2009 | Goertz et al. |
| 2010/0060475 | A1 | 3/2010 | Choi |
| 2011/0039602 | A1 | 2/2011 | McNamara et al. |
| 2011/0187652 | A1 | 8/2011 | Huibers |
| 2011/0254792 | A1 | 10/2011 | Waters et al. |
| 2012/0092332 | A1 | 4/2012 | Tsukahara et al. |
| 2013/0076697 | A1* | 3/2013 | Goertz ................. G06F 3/0421 345/175 |
| 2013/0076780 | A1* | 3/2013 | Reeves ................ G06F 3/1438 345/619 |
| 2014/0253487 | A1 | 9/2014 | Bezinge et al. |

OTHER PUBLICATIONS

Goel, Mayank / Wobbrock, Jacob O. / Patel, Shwetak N.: "GripSense: Using Built-In Sensors to Detect Hand Posture and Pressure on Commodity Mobile Phones". Proceedings of the ACM Symposium on User Interface Software and Technology (UIST '12). Cambridge, Massachusetts (Oct. 7-10, 2012). New York: ACM Press, pp. 545-554. URL: http://faculty.washington.edu/wobbrock/pubs/uist-12.pdf.

* cited by examiner

*Primary Examiner* — Andrew Sasinowski

(57) ABSTRACT

A method for gesture-based control of a portable, electronic device with a touch-sensitive surface. Novel gestures are introduced that may be compatible with conventional touch-screen gestures. Contrary to custom, the user may hold a finger or any other input object in a steady manner and may move, shift, and/or rotate the electronic device below the unmoved finger or input object. In one embodiment, the user moves a smartphone or a smartwatch toward or away from the unmoved finger to establish or terminate contact with the touchscreen. In another embodiment, the user drags or rotates the smartphone below the unmoved finger such that the unmoved finger slides on the touchscreen. An acceleration sensor and/or a gyroscope may be used for capturing the movements of the electronic device.

43 Claims, 19 Drawing Sheets

METHOD FOR GESTURE CONTROL

CROSS-REFERENCE TO RELATED APPLICATION

This application claims priority from German Patent Application DE 10 2013 007 250.6, filed Apr. 26, 2013, the entire disclosure of which is expressly incorporated herein by reference.

TECHNICAL FIELD

The present invention is related to gesture control and, particularly, to mobile electronic devices and a method for user input in conjunction with acceleration sensors, gyroscopes, and touchscreens and/or touchpads.

BACKGROUND OF THE INVENTION

A touchscreen consists of a display and a sensor for user input, and it can be considered as a touch-sensitive surface. As a combined input and output device, a touchscreen creates the feeling of very direct control of a computer by simply touching the screen. In addition, the touch-sensitive surface can be used without a display, and in this case, it is known as a touchpad.

For interacting with a touchscreen, users commonly use a finger of the hand or a stylus. Depending on the technology, the position of the finger or stylus on the touchscreen is determined by capacitive sensing or resistive sensing. The user can trigger touchscreen events through gestures, e.g., by tapping on the touchscreen with the finger or by dragging the finger over the touchscreen. The touchscreen events causes the system to execute functions, usually accompanied by a change in the content displayed on the touchscreen.

Multi-touchscreens can recognize multiple points of contact simultaneously and hence are able to detect several fingers of the user. This increases the number of possible gestures. A well-known example is the possibility to zoom in to images or text by touching the surface with two fingers and moving them apart. An overview of known gestures can be found at the URL: http://www.lukew.com/touch/ (Villamor, Craig/Willis, Dan/Wroblewski, Luke: Touch Gesture Reference Guide).

Owing to their small size, smartphones and smartwatches, i.e., phones and watches with computer functionality, have very limited space to display buttons, icons, or other control elements on the touchscreen. Therefore, for saving space on the touchscreen, it is advantageous if several different functions can be triggered by the same button, icon, or control element using different gestures. The more distinguishable gestures are available, the greater is the number of different functions that can be accessed directly from a single location on the touchscreen without further interposed interaction steps.

Smartphones and smartwatches usually are equipped with sensor devices. Common sensors include an acceleration sensor, i.e. accelerometer, a gyroscope, and a magnetometer. Each of these sensors has physical limitations and disadvantages. Therefore, a known approach involves combining several sensors to compensate for the disadvantages of individual sensors.

From prior art, it is known that functions can be triggered by shaking the smartphone or by tapping on the smartphone housing, which is detected by the acceleration sensor. In U.S. Pat. No. 7,671,756 B2, entitled "Portable electronic device with alert silencing", this gesture is applied to stop an audible alarm. Furthermore, an alternative is described that operates without an accelerometer but instead uses the touchscreen, which is intended to detect non-specific smacks. Concurrent use of the touchscreen and the accelerometer is not intended.

U.S. Pat. No. 8,125,312 B2, entitled "System and method for locking and unlocking access to an electronic device", describes how to lock and unlock a smartphone with knock patterns. An acceleration sensor is used for this purpose, and the touchscreen is not needed. Optionally, the user can enter a conventional text password using an onscreen keyboard. This is achieved through a second, independent step.

The patent application US 2011/0187652 A1 "Bump suppression" describes a method aiming to reduce user input misinterpretations. For this purpose, the system checks whether a conventional input, e.g., a tap on the touchscreen, generates a matching shock or tremor that can be detected by a built-in acceleration sensor. These shocks or tremors are short vibrations with very small amplitudes. The information from the touchscreen and from the acceleration sensor are combined solely for distinguishing between intentional and unintentional vibrations. In particular, no new gestures are introduced for the touchscreen.

In the paper "Goel, Mayank/Wobbrock, Jacob O./Patel, Shwetak N.: GripSense: Using Built-In Sensors to Detect Hand Posture and Pressure on Commodity Mobile Phones. Proceedings of the ACM Symposium on User Interface Software and Technology (UIST '12). Cambridge, Mass. (Oct. 7-10, 2012). New York: ACM Press, pp. 545-554. URL: http://faculty.washington.edu/wobbrock/pubs/uist-12.pdf", methods are presented to determine the pressure on a touchscreen as soon as it is touched by the user. In addition, an attempt is made to identify the hand posture. For this purpose, among others, a gyroscope is used to detect minimal and unintentional rotations that occur as the user interacts with the smartphone using just one hand and the thumb. Only conventional and known gestures are described. The paper narrows down to determine additional information about the hand posture for improving input quality.

The patent application US 2011/0254792 A1 describes a method for enhanced control of an application program, which works like a data recorder. A first conventional tap on the touchscreen starts recording and monitoring of acceleration and/or gyroscope data. A second tap on the touchscreen stops the recording. The spatial movement of the smartphone between the first and second taps is interpreted as a gesture. Alternatively, the recording of sensor data can take place so long as a finger touches the touchscreen at a specific location, known as "touch and hold" or "long press."

The patent application US 2010/0060475 A1 describes a touchscreen with a proximity sensor that allows users to interact with an application program by holding a finger over the touchscreen without touching it. Finally, patent application US 2012/0092332 A1 describes a method to control in three dimensions an image displayed on a screen. This is achieved by tilting the device and performing a conventional drag gesture with a finger.

SUMMARY OF THE INVENTION

Aspects of the present disclosure are directed to a method that introduces novel gestures in addition to familiar touchscreen gestures. Among others, with embodiments of the present invention, it may be possible to access several different features or functions of an operating system or an application program by using only a single button, icon, or control element shown on the touchscreen. Alternatively, for global operating system functions, it may be possible to use the novel gestures at any location on the touchscreen, regardless of the content displayed on the screen and without interfering with conventional buttons, icons, or control elements. In this case, for purpose of example only, the novel gestures are not associated with a specific button, icon, or control element on the touchscreen but are instead assigned to appropriate functions of the operating system or application program. In each case, the novel gestures can be performed in such a way that they are compatible with familiar touchscreen gestures so that both novel and familiar touchscreen gestures can be supported simultaneously.

The scope of the embodiments is set forth by means of the features of the independent claims. Advantageous embodiments, alternatives, and optional features are specified in the dependent claims.

In accordance with the claims, a portable electronic device may be equipped with a touch-sensitive surface and with at least one accelerometer, gyroscope, magnetometer and/or comparable position or attitude sensor. The touch-sensitive surface may be a touchscreen or a touchpad, and the portable electronic device may be a mobile phone, smartphone, tablet computer, smartwatch (watch with touchscreen) or wearable computer (also known as wearable).

Furthermore, in conjunction with a tap or a drag on the touch-sensitive surface of the portable electronic device, it is not necessarily the finger or another input object that is moved towards, over, or away from the touch-sensitive surface in an ordinary way, but instead and contrary to custom, the portable electronic device with the touch-sensitive surface may be moved, shifted, and/or rotated below the stationary finger or input object, which is held in place. In this way, novel gestures can be realized. The invention thus has a surprising effect because its constituents do not interact in the customary manner.

In one embodiment, the user moves a smartphone or a smartwatch towards or away from the unmoved finger to establish or terminate contact with the touchscreen. In another embodiment, the user drags or rotates the smartphone below the unmoved finger. These and many other aspects of the invention will be comprehensible to those skilled in the art after reading detailed descriptions of the embodiments.

BRIEF DESCRIPTION OF THE DRAWINGS

Further objectives, advantages, and possible applications of the methods according to the present invention, as well as exemplary processes and additional details of the embodiments, will be apparent from the features shown in the drawings.

DETAILED DESCRIPTION OF THE INVENTION

Figure 1:
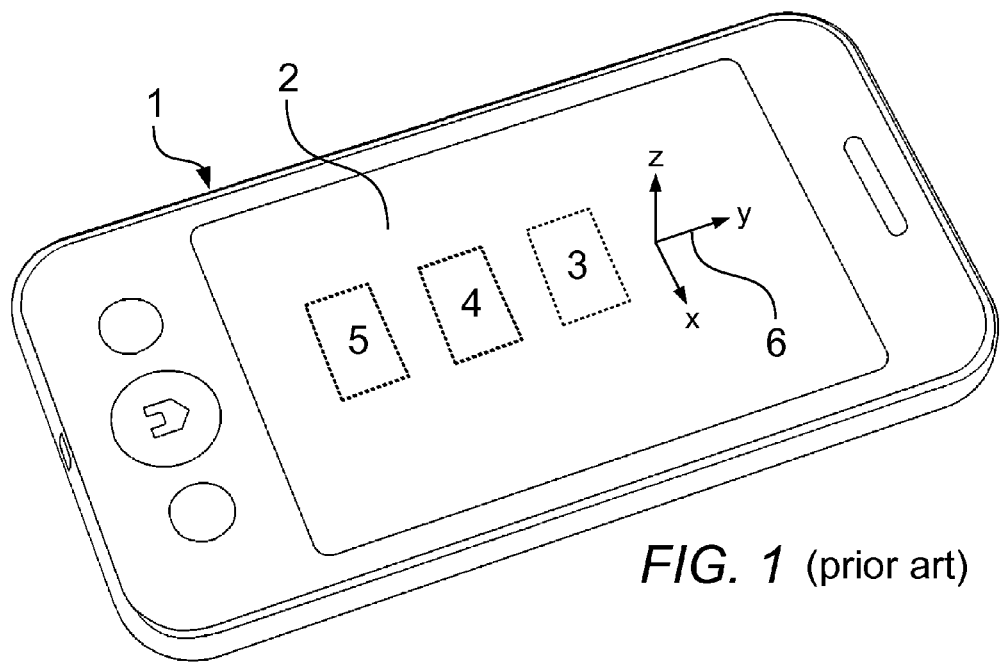
FIG. 1 shows a smartphone with touchscreen, accelerometer, gyroscope, and magnetometer.

FIG. 1 shows a portable electronic device, in this case, a smartphone 1 with an accelerometer 3, a gyroscope 4, a magnetometer 5, and a touch-sensitive surface. The touch-sensitive surface is usually a touchscreen 2. Typically, a three-axis accelerometer 3, a three-axis gyroscope 4, and a three-axis magnetometer 5 are used, which are able to capture the acceleration and rotation in all spatial directions. In this specification, the local coordinate system 6 of the smartphone 1 is defined as shown in FIG. 1.

In regular operation, a user may hold the smartphone 1 in his/her first hand 100, while tapping on the touchscreen 2 with the index finger 101 of the second hand. Likewise, the user may perform other conventional gestures with the fingers 101. For this purpose, the user attempts to keep the smartphone 1 steady with the first hand 100 for precisely touching a target on the touchscreen 2. The approach to move the finger 101 of the upper hand above the unmoved touchscreen 2 can be ascribed to human intuition and owing to the omnipresence of smartphones, this approach has become a habit. Therefore, it is no longer questioned.

For introducing novel and additional gestures, according to embodiments of the present invention, the portable electronic device 1 may be moved, shifted, and/or rotated beneath the stationary finger 101 of the second hand, which is held in place.

Figure 2:
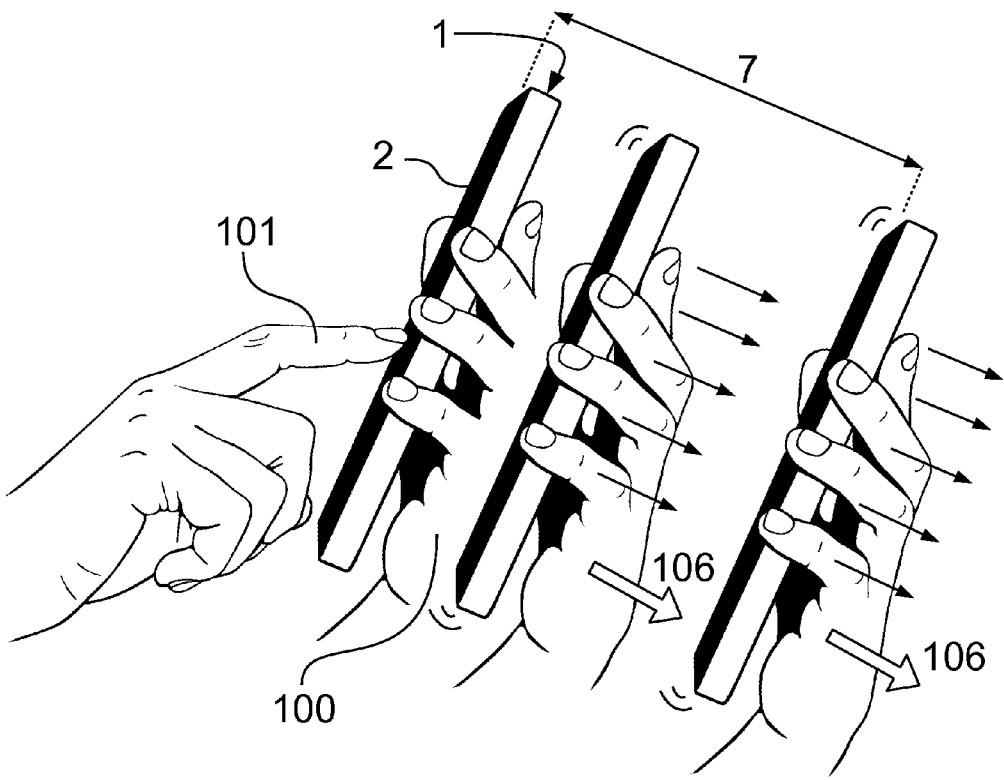
FIG. 2 illustrates the basic concept of the novel "move-away" gesture.

FIG. 2 shows an example as an introduction: After touching the touchscreen 2 with the index finger 101, the index finger 101 is not lifted from the surface, but the smartphone 1 is moved away 106 instead. In the course of this, the index finger 101 is not moved and remains in the same position as that while it was still touching the touchscreen 2.

The distance 7 is defined by the displacement of the smartphone 1 between the beginning and end of the gesture. The gesture ends as soon as the hand 100 that holds the smartphone 1 stops moving. The movement of the smartphone 1 and the distance 7 are determined by means of the accelerometer 3. The distance 7 of the gesture can be used as an additional, analog input value for adjusting the intensity of a function or operation, e.g., in the case of volume control, a small distance 7 such as 2 cm changes the current volume slightly while a large distance 7 such as 20 cm changes the volume significantly.

Figure 3:
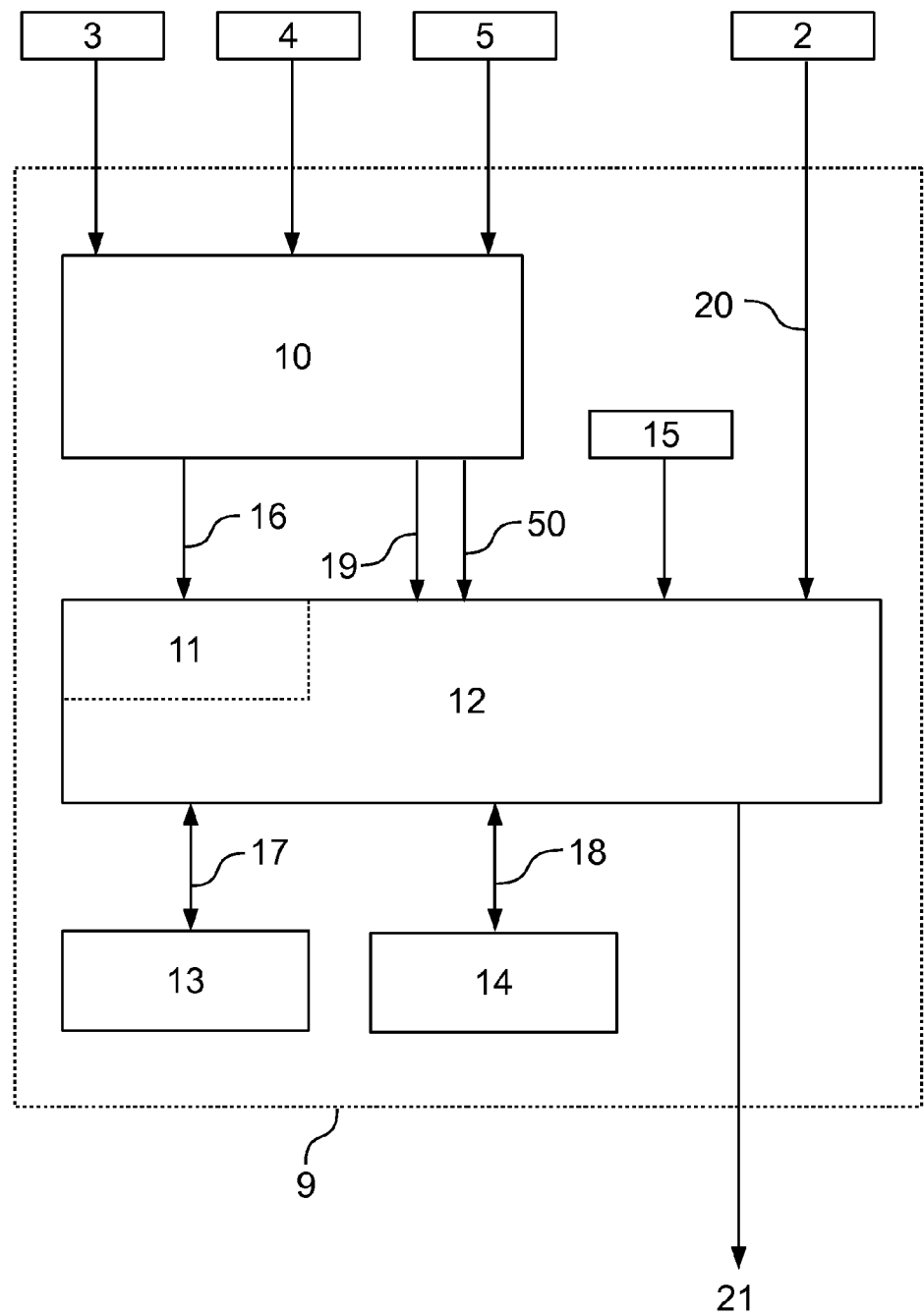
FIG. 3 shows the block diagram of an embodiment.

The block diagram in FIG. 3 shows an embodiment in which the novel gestures are implemented into an operating system, e.g., the operating system of a smartphone 1 or a smartwatch. Block 9, shown with a dotted line, can be implemented as a hardware circuit, a software implementation, or a hardware-software combination. A hardware circuit can be built as an FPGA (field programmable gate array) or an ASIC (application-specific integrated circuit).

The hardware circuit or software implementation 9 has access to sensor data of the accelerometer 3, gyroscope 4, and magnetometer 5 and acts as an intermediate layer that receives conventional touchscreen events 20 as input and triggers gesture events 21 as output. Depending on the detected gestures (conventional or novel), the original touchscreen events 20 are forwarded and/or a gesture event 21 for a novel gesture is generated.

The accelerometer 3, gyroscope 4, and magnetometer 5 have their respective physical limitations and disadvantages. Therefore, a known approach is to combine several sensors in order to compensate as much as possible for their individual disadvantages. This is hereinafter referred to as combined motion analysis 10, also known as "combined motion" or "augmented sensor data".

For detecting translational accelerations or movements regardless of the spatial alignment of the smartphone 1, it is necessary to eliminate the gravity component from the data measured by the accelerometer 3. The gyroscope 4 and the magnetometer 5 are useful for detecting changes in the direction of gravity and, thus, contribute significantly toward eliminating the gravity component.

The rotational speed measured by the gyroscope 4 must be integrated to obtain angular positions. Upon integration, the result is prone to drift. This can be compensated for using the magnetometer 5.

Regarding the embodiment shown in FIG. 3, the data captured by the three sensor devices (accelerometer 3, gyroscope 4, and magnetometer 5) are evaluated and optimized by means of combined motion analysis 10. The results are accelerations 16 devoid of gravity as well as drift-free angular positions 19, 50.

The angular positions 19, 50 around the X- and Z-axis are inputs to the control unit 12. The acceleration values 16, compensated for gravity and represented in terms of their X, Y, and Z components, are continuously buffered in a buffer 11, such that the buffer 11 always contains the recent acceleration values 16, for example, the acceleration in the past two seconds.

The buffered acceleration values 16 are used in the case of a touchscreen event 20, in particular, at the beginning of contact on the touchscreen 2 or in the case of a "drag" or "flick" event reported by the touchscreen 2. Owing to the buffer 11, information about translational acceleration 16 just before the touchscreen event 20 is available for all directions (X, Y, Z).

In addition to the acceleration 16, the velocity 17 and position shift 18 of the smartphone 1 are considered in the user input analysis. If required, e.g. in case of a touchscreen event 20, the control unit 12 arranges for a velocity curve 17 to be calculated using integrator 13 and the acceleration data 16 stored in the buffer 11. After calibration of the velocity curve 17, the course of the shift in position 18 is calculated using integrator 14. The velocity curve 17 and the position shift 18 are represented in terms of their X, Y, and Z components.

The objective is to identify novel gestures and distinguish between conventional and novel gestures. This task is handled by the control unit 12. For this purpose, the control unit 12 has access to a timer 15, which generates a timing signal.

In the case of a conventional gesture such as a tap or a drag on the touchscreen 2, it can be assumed that the user attempts to keep the smartphone 1 stationary to ensure that a target can be touched precisely. Hence, the values of velocity 17, position shift 18, and angular rotation 19, 50 of the smartphone 1 will be small. Ongoing accelerations in the same direction will not occur. The requirement of a relatively stationary smartphone 1 during the input of conventional gestures can be established as instructions for use.

The velocity 17 and the angle of rotation 19, 50 are analyzed by the control unit 12 and in case these values indicate a nearly stationary smartphone 1, it is assumed that a conventional touchscreen gesture is input by the user. In this case, the original touchscreen events 20 generated by the touchscreen 2 are forwarded as gesture events 21.

Otherwise, if significant changes in the velocity 17 are detected in the period before, after, and/or during the touchscreen input or if the angle of rotation 19, 50 changes significantly during an ongoing touch event, the control unit 12 checks whether a novel gesture is input by the user.

Hereinafter threshold values are used to distinguish whether the user moves the smartphone 1 or whether he/she maintains it relatively stationary: A threshold value for negligible velocity 22, a threshold value for minimum velocity 23, a threshold value for minimum acceleration 24, and a threshold value for minimum rotation 25. Suitable threshold values can be established empirically, by determining a reasonable or individually adjusted range of variation during regular use of the smartphone 1. All threshold values are defined as positive values.

Figure 4:
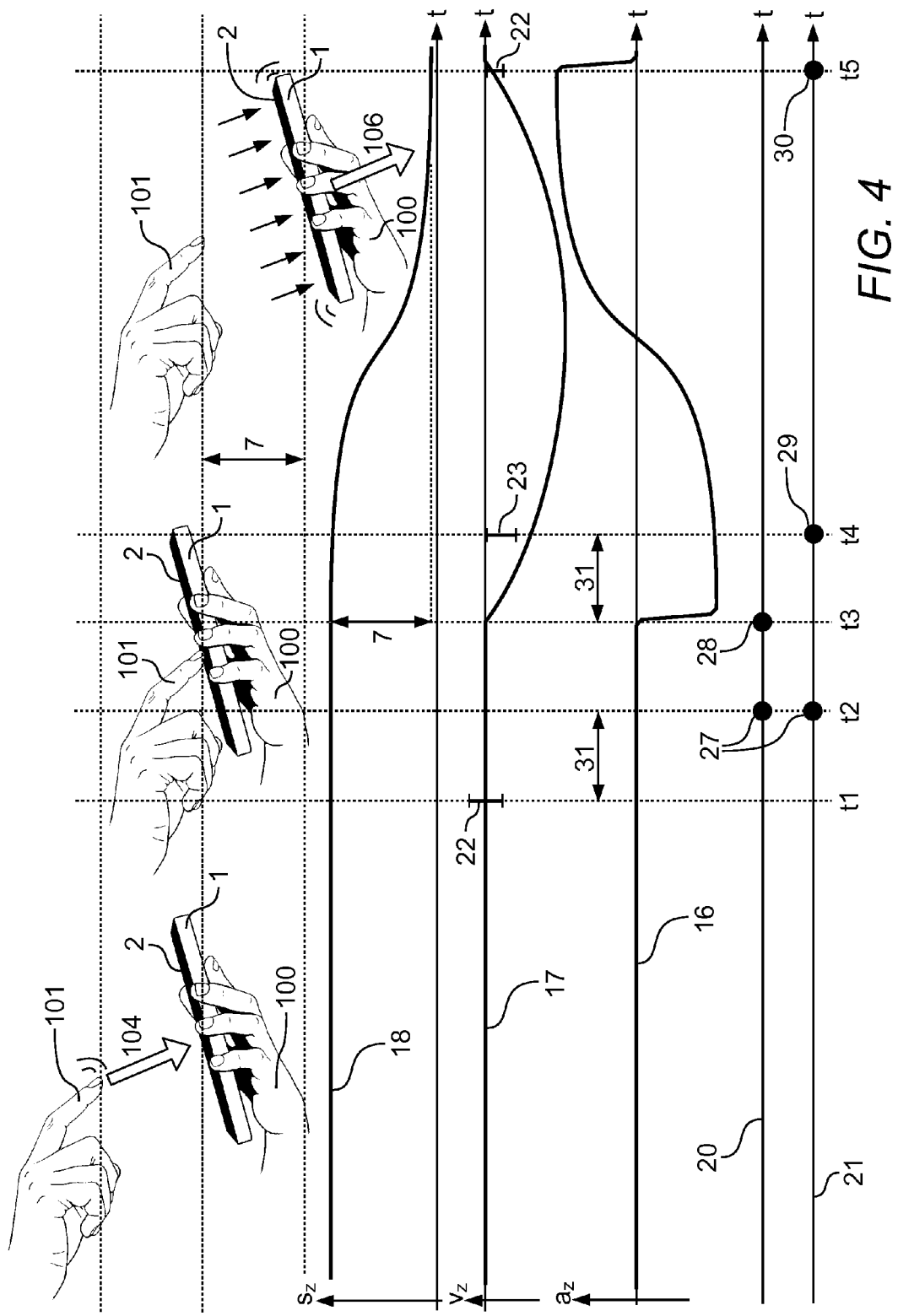
FIG. 4 illustrates the novel "move-away" gesture with corresponding curves and events.

FIG. 4 shows the novel gesture "move-away", which was introduced in FIG. 2 as an example. In the upper part of FIG. 4, the course of the gesture is shown using the example of a smartphone 1, which is held in the left hand 100. The touchscreen 2 is touched with the index finger 101 of the right hand. The chronological sequence of the gesture is to be interpreted from left to right, corresponding to the time axis t.

The curves show the corresponding acceleration 16 ("$a_z$"), velocity 17 ("$v_z$"), and position shift 18 ("$s_z$") in an idealized manner. The acceleration curve 16 represents the Z component of the accelerometer 3 compensated for gravity. The upward direction approximately perpendicular to the touchscreen 2 is defined as the positive Z direction for acceleration 16, velocity 17, and position shift 18. The values of the X and Y components are assumed to be near zero and are not shown.

Furthermore, FIG. 4 shows the input and output events processed by the control unit 12. Input events include the touchscreen event "contact begin" 27 at time point t2 and the touchscreen event "contact end" 28 at time point t3. Gesture events 21 triggered by the control unit 12 include a forwarded "contact begin" 27 at time point t2 and the event "move-away recognized" 29 at time point t4, which indicates that the novel gesture has been recognized. Finally, an event "distance of move-away" 30 is issued at time point t5, as soon as the gesture is completed.

From the user's perspective, for purpose of example only, the "move-away" gesture is performed as follows:

While holding the smartphone 1 in a relatively stationary manner with the left hand 100, the user touches 104 a desired location on the touchscreen 2 with the index finger 101 of the right hand. The desired location on the touchscreen 2 could be a button, an icon, a control element, or a large touchscreen area. In FIG. 4, this part of the gesture sequence is shown on the left. As of time point t2, the user touches the touchscreen 2. This is shown in the middle of FIG. 4.

To trigger the novel "move-away" gesture instead of a conventional tap, the user moves the smartphone 1 downwards 106 and away from the index finger 101 with the left hand 100. The index finger 101 of the right hand is held in place and is not moved, i.e., the index finger 101 remains in the position and the height at which it was located while still touching the touchscreen 2. At the time t3, the touchscreen 2 loses contact with the index finger 101 owing to movement of the smartphone 1. After moving the smartphone 1 away from the index finger 101, e.g., to a distance of 5 cm, the user will stop the movement of the left hand 100 in an intuitive manner. At the time t5, the "move-away" gesture is completed.

From the perspective of the control unit 12 pursuant to the embodiment shown in FIG. 3, the "move-away" gesture is recognized as follows:

The touchscreen 2 indicates the beginning of a contact at time point t2 by triggering the touchscreen event "contact begin" 27. The event "contact begin" 27 is passed on unfiltered as a gesture event 21. In case the location of contact on the touchscreen 2 is relevant, that is, a button, an icon, a control element, or a section of the touchscreen 2 is touched which accepts the "move-away" gesture as an input, the prior velocity curve 17 is calculated. This is done using the integrator 13, which calculates the velocity curve 17 from the current acceleration data 16 stored in the buffer 11. For example, the velocity curve 17 could represent the last two seconds, depending on the size of the buffer 11. The velocity curve 17 is calibrated such that the velocity components X, Y, and Z are zero at time point t2, to compensate for possible drift of the integrator 13.

Time point t1 is obtained from the current time t2 minus a time offset "delta t" 31. A suitable value for "delta t" 31 is to be determined empirically. E.g., time offset "delta t" 31 may be greater than the duration it takes to establish contact with the index finger 101 on the touchscreen 2, and it should be much smaller than the duration of the entire gesture.

To distinguish between conventional and novel gestures and to classify the user input, the velocity 17 of the smartphone 1 at time point t1 is queried from the velocity curve 17. In case of the "move-away" gesture, the following decision criteria are defined:

1st Criterion: The magnitude of velocity 17 at time point t1 must be less than the threshold value for negligible velocity 22.

As soon as the event "contact end" 28 is triggered by the touchscreen 2 at time point t3, the further course of velocity 17 is calculated in real time via continuous integration of the current acceleration values 16 using the integrator 13, the initial value of velocity 17 at time point t3 being set to zero.

The timer 15 triggers time point t4, which is obtained by adding the offset "delta t" 31 to time point t3. At time point t4, the corresponding velocity 17 is checked once again to classify the user input. In case of the "move-away" gesture, this is defined as follows:

2nd Criterion: The Z component "$v_z$" of the velocity 17 at time point t4 must be negative and the absolute value of the Z component "$v_z$" must be greater than the threshold value for minimum velocity 23.

3rd Criterion: The magnitude of the X and Y components of velocity 17 at time point t4 must be less than the threshold value for negligible velocity 22.

In the case that all criteria are fulfilled, the "move-away" gesture is recognized and the control unit 12 triggers the corresponding gesture event "move-away recognized" 29 at time point t4. The conventional event "contact end" 28 from the touchscreen 2 is suppressed and is not output as a gesture event 21 owing to detection of the "move-away" gesture.

However, if at least one criterion does not apply, it is assumed that the current user input is not the "move-away" gesture, and in case the specific location on the touchscreen 2 supports further gestures of the novel type, as described below, the criteria for these gestures are now checked. If these criteria are not met either, a conventional touchscreen input is considered, e.g. a conventional tap, and the retained touchscreen event "contact end" 28 received by the control unit 12 at time point t3 is passed on as gesture event 21 at time point t4.

If required, the distance 7 of the "move-away" gesture can be determined. The distance 7 is the displacement of the smartphone 1 between time point t3 and time point t5. Time point t5 is reached as soon as the user stops moving the smartphone 1 at the end of the gesture. For this purpose, the control unit 12 monitors the velocity 17 starting at time point t4. As soon as the velocity curve 17 drops below the threshold value for negligible velocity 22, the final time t5 is reached. Next, the position shift 18 of the smartphone 1 in the interval between t3 and t5 is calculated from the velocity curve 17 using the integrator 14. The distance 7 is derived from the values of the position shift curve 18, specifically, from the difference between the value at time point t3 and that at time point t5.

The distance 7 can be handed over to an application program. For this purpose, a gesture event "distance of move-away" 30 is triggered by the control unit 12 at time point t5 for transferring the input parameter.

The gesture events 21 triggered by the gesture "move-away" cause the operating system or an application program ("app") to perform an appropriate function or action. For example, the "move-away" gesture can be used as an "undo" function: An incorrect user input such as a wrong letter or digit is undone by performing the "move-away" gesture.

Moreover, the gesture "move-away" can be used as a cross-application gesture to delete an element such as a file, a document, an image, or a calendar entry. While conventional gestures such as taps or drags execute appropriate actions concerning a selected element, performing the "move-away" gesture deletes the selected element without the need for a separate "delete" button, "refuse bin" icon, or corresponding menu item on the touchscreen 2.

Figure 5:
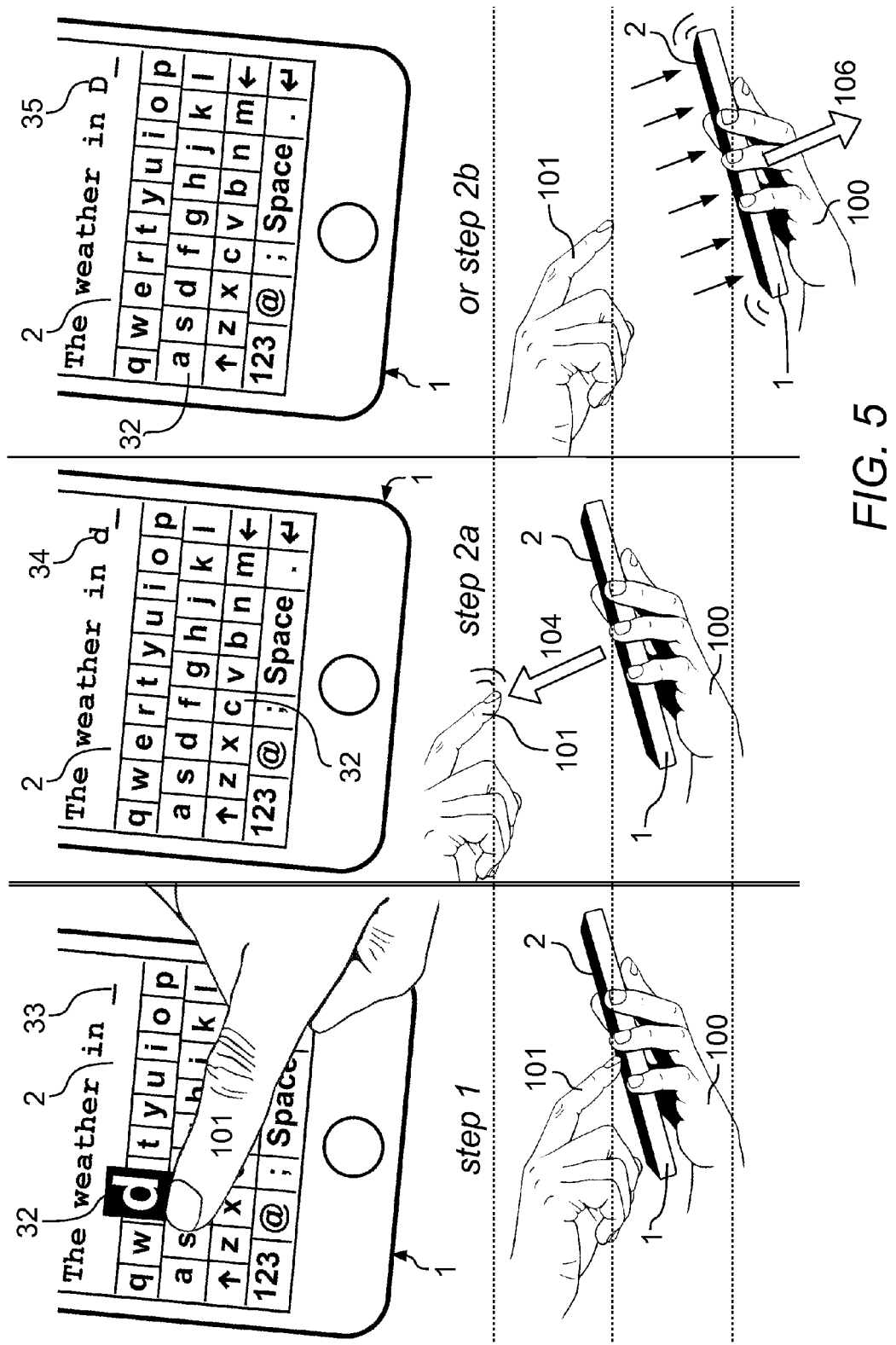
FIG. 5 shows how to enter uppercase letters with an onscreen keyboard without using a shift key.

FIG. 5 shows an embodiment of an onscreen keyboard 32 that uses a variant of the "move-away" gesture. Combined with conventional typing on the keyboard 32, this variant of the "move-away" gesture allows the user to enter uppercase letters without having to use a shift key or a caps lock key.

Usually, onscreen keyboards 32 highlight the key that has been "pressed" by the user while touching the touchscreen 2. Only once the user releases the key, the selected character is entered into an input mask or text editor.

In "Step 1" on the left side of FIG. 5, it is shown how the user presses the virtual key "d" of the onscreen keyboard 32 to enter the character "d" or "D" at the cursor 33. While pressing down the key, it is irrelevant how the user establishes contact between the finger 101 and the touchscreen 2. In particular, it does not matter whether the finger 101 is moved to the touchscreen 2 or whether the touchscreen 2 is moved to the finger 101, or both. Thus, it is not necessary that the smartphone 1 is held steady at the onset of contact. An analysis of the motion of the smartphone 1 does not take place at time point t1. This distinguishes the embodiment of the onscreen keyboard 32 from the embodiment pursuant to FIG. 4.

Referring to the side view of the smartphone 1 in the lower part of FIG. 5, in "Step 2a", the user removes the finger 101 from the touchscreen 2 in a conventional manner. While removing the finger 101, the user holds the smartphone 1 relatively stationary, which is detected by the accelerometer 3. As a result, a lowercase letter 34, in this case a "d", is entered at cursor position 33.

However, if the user wants to enter an uppercase letter he/she uses the "move-away" gesture, as shown in "Step 2b": Starting from the pressed key "d" of "Step 1", the user moves the smartphone 1 downwards, while the finger 101 is held in place. This is detected by the accelerometer 3 and as a result, an uppercase letter 35, in this case a "D", is entered at the cursor position 33. A shift key or a caps lock key is not required in this case.

Only in the case that the smartphone 1 is moved in the negative Z direction, i.e., along the direction of the back of the touchscreen 2, an uppercase letter is entered. In any other case, even in the case of acceleration in the positive Z direction, a lowercase letter is entered.

Another area of application of the "move-away" gesture is an onscreen keyboard with auto-complete, which suggests words while typing. In a possible embodiment, a suggested word is already displayed while the user presses down the key of the current character, i.e., the finger 101 is still in contact with the touchscreen 2.

In order to accept the suggested word from auto-complete, the user performs the "move-away" gesture: Starting from the pressed key the user moves the smartphone 1 downwards, while the typing finger 101 is held in place. This is detected by the accelerometer 3 and as a result, the word suggested by auto-complete is entered into the input mask or text editor. By using the "move-away" gesture for auto-complete, it is not necessary to tap on the suggested word in a second, separate step.

To ignore the current proposal of auto-complete, the user lifts his finger 101 in a conventional manner from the key on the touchscreen 2 without moving the smartphone 1. This is detected by the accelerometer 3 and as a result, only the corresponding character is entered into the input mask or text editor.

Figure 6:
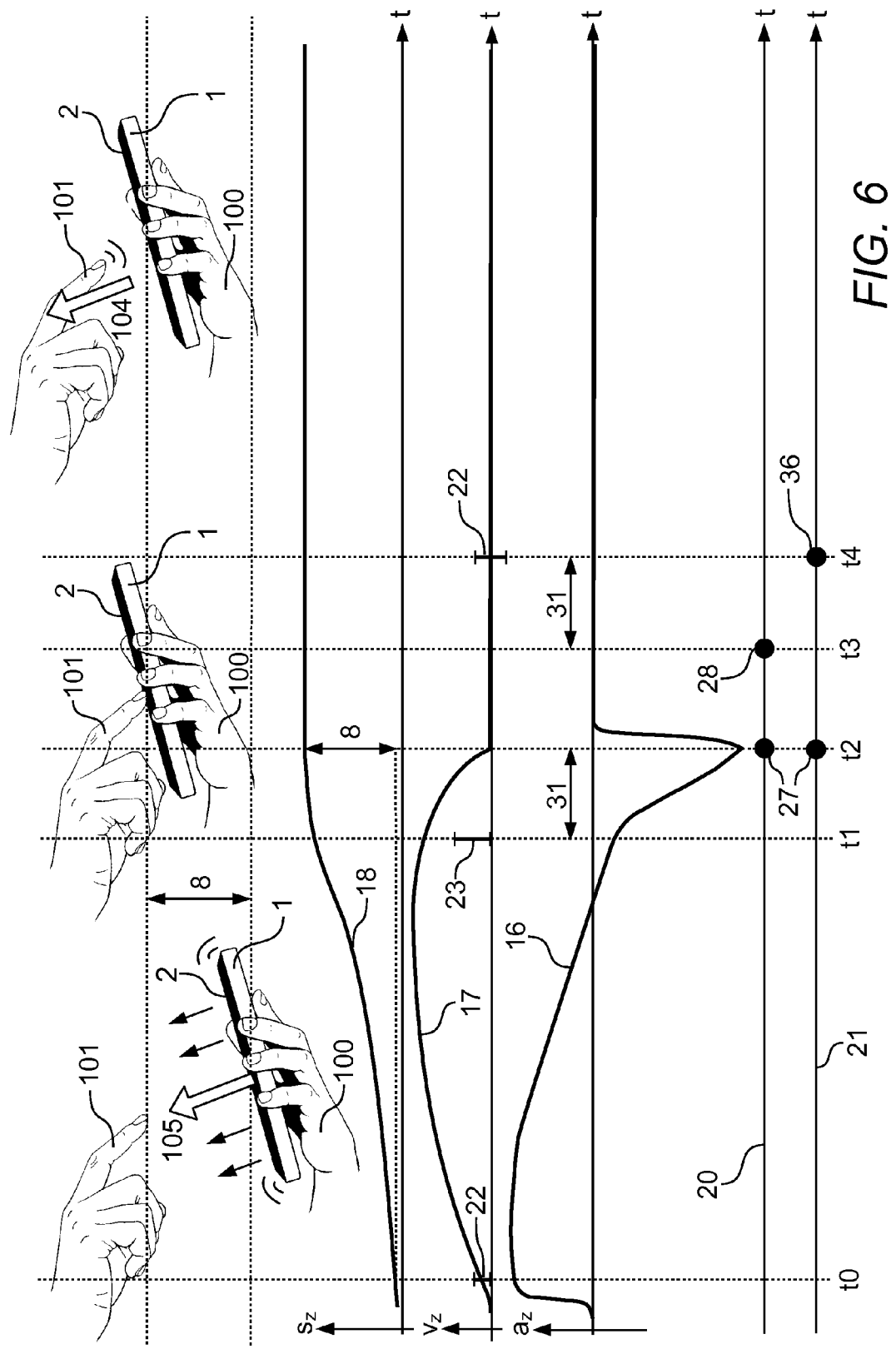
FIG. 6 illustrates the novel "pull up" gesture with corresponding curves and events.

FIG. 6 shows the novel gesture "pull up". Except for the specific sequence of the gesture, the general description pursuant to FIG. 4 applies.

From the user's perspective, for purpose of example only, the "pull up" gesture is performed as follows:

The user holds the smartphone 1 with the left hand 100 while positioning the index finger 101 of the right hand at a distance 8 of a few centimeters apart from the touchscreen 2. The distance 8 could be, for instance, 5 cm. The index finger 101 is positioned approximately perpendicular above a desired location on the touchscreen 2, such as a button, an icon, a control element, or a large touchscreen area. In FIG. 6, this part of the gesture sequence is shown on the left.

While the user holds the index finger 101 of the right hand steadily, the smartphone 1 is moved towards 105 the index finger 101, starting at time point t0, until the touchscreen 2 is in contact with the index finger 101 at the desired location at time point t2. This is shown in the middle of FIG. 6: The user lifts the smartphone 1, which is held approximately horizontally, until it hits the stationary index finger 101 of the right hand. The impact stops the movement abruptly, and the smartphone 1 comes to a halt again. As of time point t2, the index finger 101 touches the touchscreen 2.

At time point t3, the user lifts 104 the index finger 101 from the touchscreen 2 in a conventional manner, while maintaining the smartphone 1 stationary with the left hand 100. In case the smartphone 1 is still stationary at time point t4, the "pull up" gesture is input.

From the perspective of the control unit 12 pursuant to the embodiment shown in FIG. 3, the "pull up" gesture is recognized as follows:

The touchscreen 2 indicates the beginning of a contact at time point t2 by triggering the touchscreen event "contact begin" 27. The event "contact begin" 27 is passed on unfiltered as a gesture event 21. In case the location of contact on the touchscreen 2 is relevant, that is, a button, an icon, a control element, or a section of the touchscreen 2 is touched which accepts the "pull up" gesture as an input, the prior velocity curve 17 is calculated. This is done using the integrator 13, which calculates the velocity curve 17 from the current acceleration data 16 stored in the buffer 11. The velocity curve 17 is calibrated such that the velocity components X, Y and Z are zero at time point t2, to compensate for possible drift of the integrator 13.

To distinguish between conventional and novel gestures and to classify the user input, the velocity 17 of the smartphone 1 at time point t1 is queried from the velocity curve 17. Time point t1 is obtained from the current time t2 minus the time offset "delta t" 31. In case of the "pull up" gesture, the following decision criteria are defined:

1st Criterion: The Z component "$v_z$" of the velocity 17 at time point t1 must be positive and the absolute value of the Z component "$v_z$" must be greater than the threshold value for minimum velocity 23.

2nd Criterion: The magnitude of the X and Y components of velocity 17 at time point t1 must be less than the threshold value for negligible velocity 22.

As soon as the event "contact end" 28 is triggered by the touchscreen 2 at time point t3, the further course of velocity 17 is calculated in real time via continuous integration of the current acceleration values 16 using the integrator 13, the initial value of velocity 17 at time point t3 being set to zero.

The timer 15 triggers time point t4, which is obtained by adding the offset "delta t" 31 to time point t3. At time point t4, the corresponding velocity 17 is checked once again to classify the user input. In case of the "pull up" gesture, this is defined as follows:

3rd Criterion: The magnitude of velocity 17 at time point t4 must be less than the threshold value for negligible velocity 22.

In the case that all criteria are fulfilled, the "pull up" gesture is recognized and the control unit 12 triggers the corresponding gesture event "pull up recognized" 36 at time point t4. The conventional event "contact end" 28 from the touchscreen 2 is suppressed and is not output as a gesture event 21 owing to detection of the "pull up" gesture.

However, if at least one criterion does not apply, it is assumed that the current user input is not the "pull up" gesture, and in case the specific location on the touchscreen 2 supports further gestures of the novel type, the criteria for these gestures are now checked. If these criteria are not met either, a conventional touchscreen input is considered, and the retained touchscreen event "contact end" 28 received by the control unit 12 at time point t3 is passed on as gesture event 21 at time point t4.

If required, the distance 8 of the "pull up" gesture can be determined. The distance 8 is the displacement of the smartphone 1 between time point t0 and time point t2. The time point t0 is determined by scanning the velocity curve 17 backwards, beginning at time point t1, until the velocity drops below the threshold value for negligible velocity 22. Next, the position shift 18 of the smartphone 1 in the interval between t0 and t2 is calculated from the velocity curve 17 using the integrator 14. The distance 8 is derived from the values of the position shift curve 18, specifically, from the difference between the value at time point t0 and that at time point t2.

The distance 8 can be handed over to an application program. This can be done together with the gesture event "pull up recognized" 36 at time point t4 by transferring the distance 8 as an input parameter.

Figure 9:
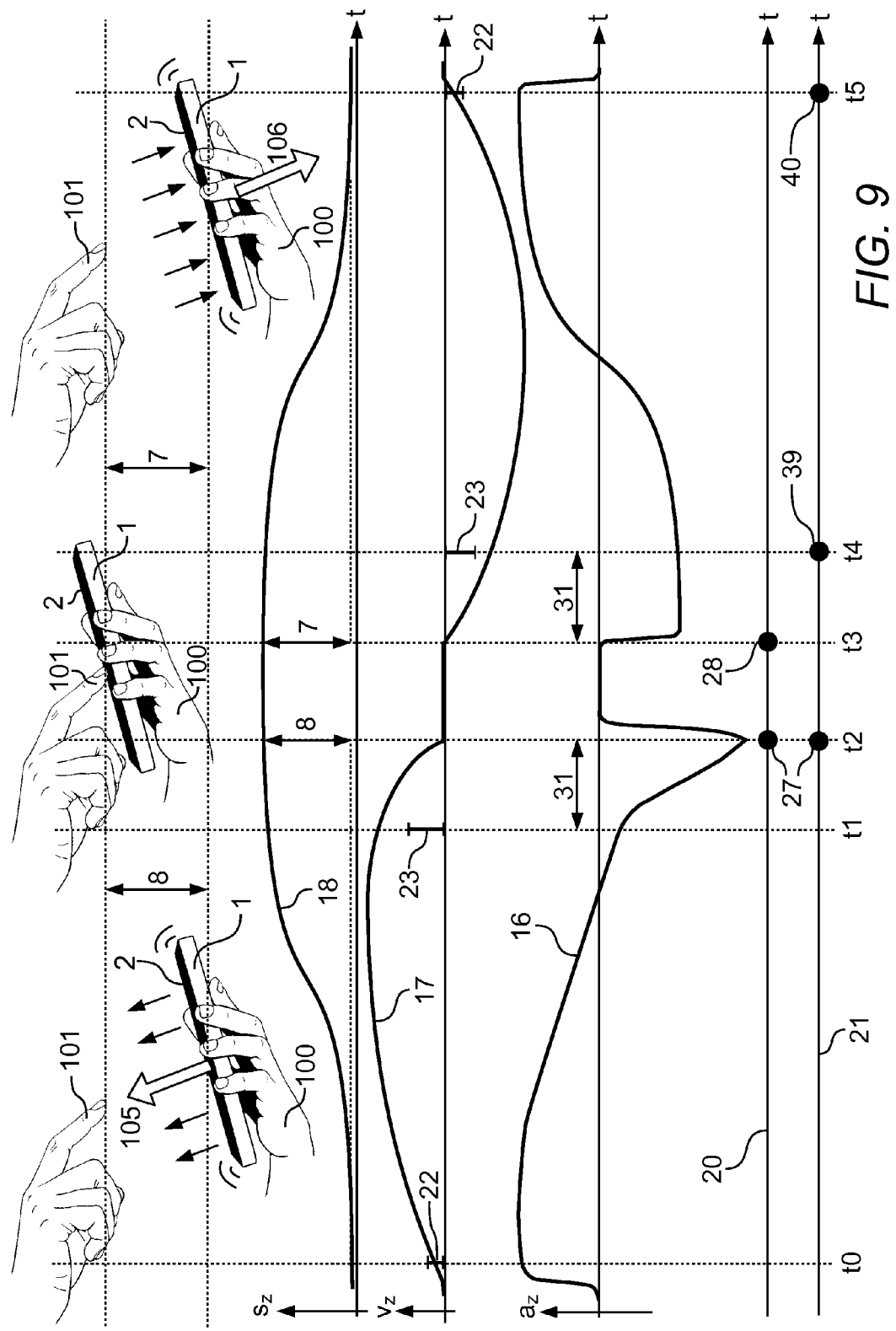
FIG. 9 illustrates the novel "inverse tap" gesture with corresponding curves and events.

FIG. 9 introduces another gesture of the novel type, called "inverse tap", which is a combination of the "pull up" and "move-away" gestures. Under the condition that the "inverse tap" gesture is not required by a specific control element or touchscreen area, it is possible to recognize the "pull up" gesture at an earlier stage, namely at time point t2 instead of time point t4. Accordingly, the corresponding gesture event "pull up recognized" 36 can be triggered at time point t2 already.

Figure 7:
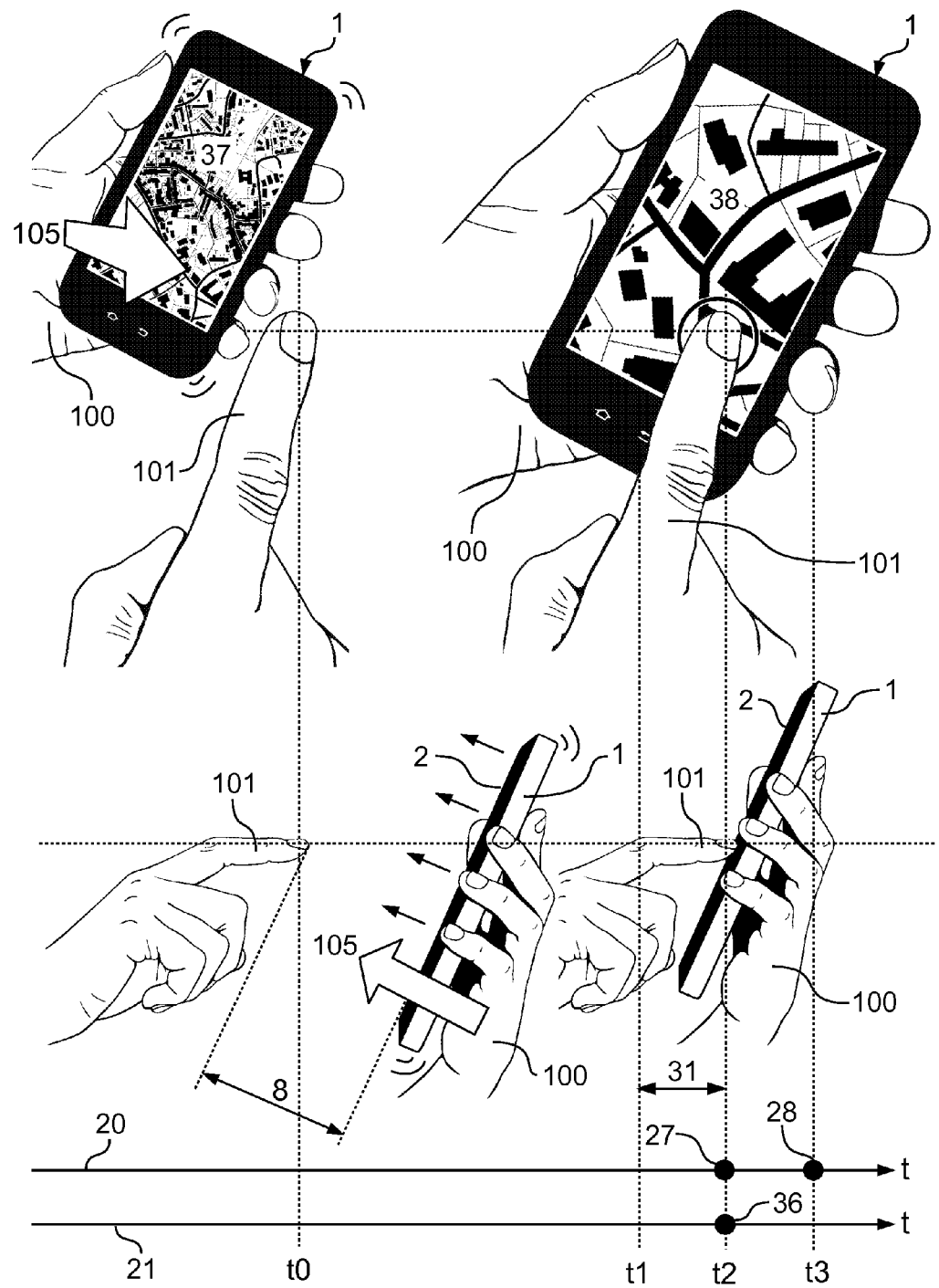
FIG. 7 shows how to zoom in to a map using the "pull up" gesture.
Figure 8:
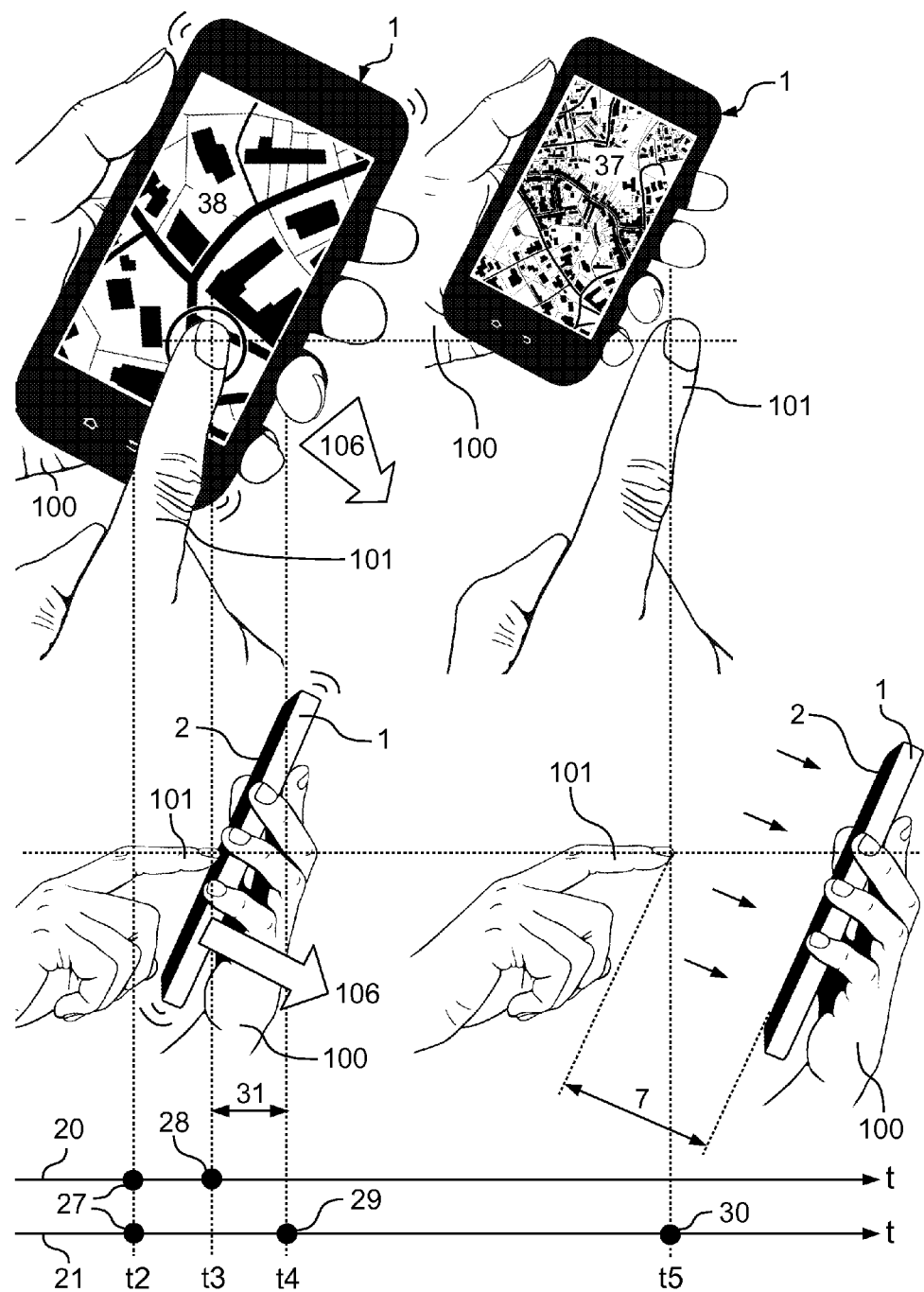
FIG. 8 shows how to zoom out of a map using the "move-away" gesture.

This is shown in FIG. 7 and FIG. 8 using the example of a zoom-able map. The map 37, 38 is a control element that fills the entire touchscreen 2 and accepts the "pull up" and "move-away" gestures at any location on the touchscreen 2. The "pull up" gesture is used to zoom in, and the "move-away" gesture is used to zoom out. FIG. 7 and FIG. 8 show a top-down view as well as a side view of the smartphone 1. The chronological sequence of the gestures, as well as the touchscreen events 20 and gesture events 21, are to be interpreted from the left to the right, corresponding to the time axis t.

In order to zoom in, the "pull up" gesture is performed, as shown in FIG. 7: Starting at time point t0, the user moves the smartphone 1 towards the unmoved index finger 101. As soon as the touchscreen 2 is in contact with the index finger 101 at time point t2, the touchscreen event "contact begin" 27 is triggered and the velocity curve 17 is calculated using the buffer 11 and the integrator 13.

If the velocity 17 at time point t1 is greater than the threshold value for minimum velocity 23, the distance 8 of the gesture is calculated by means of the integrator 14. Moreover, the gesture event "pull up recognized" 36 is triggered at time point t2 already. A second check of the velocity 17 at time point t4 does not take place. The conventional event "contact end" 28 from the touchscreen 2 is suppressed and is not output as a gesture event 21 owing to detection of the "pull up" gesture.

Once the gesture event "pull up recognized" 36 is triggered at time point t2, the determined distance 8 is handed over to the application program ("app"), which zooms into the map 38 instantly. Thus, the user gets an immediate response to the "pull up" gesture even before lifting the finger 101 from the touchscreen 2.

The performed distance 8 of the gesture controls the zoom factor. Depending on the embodiment this can be a linear relation. For example, in the case that the user starts the gesture with a distance of 3 cm, the map is zoomed by a factor of two, and if the user starts the gesture with a distance of 6 cm, the map is zoomed by a factor of four. Other correlations between distance 8 and zoom factor are possible, too, e.g., an exponential relation.

In order to zoom out, the "move-away" gesture is performed, as shown in FIG. 8. As soon as the gesture is completed and recognized by the control unit 12, the gesture event "distance of move-away" 30, triggered at time point t5, is used to hand over the determined distance 7 to the application program ("app"), which zooms out of the map 37 instantly.

Alternatively, the map can start to zoom out at time point t4 already, and as the user performs the "move-away" gesture, the respective current distance 7 of the gesture controls the current zoom factor. Thus, users get immediate feedback while performing the gesture, and they stop the movement of the smartphone 1 as soon as the current zoom factor meets their requirement.

Compared with conventional zoom gestures such as "pinch" and "spread", both involving two fingers, the combination of the novel gestures "pull up" and "move-away" can be executed with just one finger 101. Hence, it is suitable for extremely small displays such as the touchscreen 2 of a smartwatch, which is too small to work with two fingers in a reasonable way. The same concept regarding the zoom control is also applicable for other adjustable values or properties such as a volume control or a brightness control e.g. for a display.

FIG. 9 shows the novel gesture "inverse tap". Except for the specific sequence of the gesture, the general description pursuant to FIG. 4 applies.

From the user's perspective, for purpose of example only, the "inverse tap" gesture is performed as follows:

The user holds the smartphone 1 with the left hand 100 while positioning the index finger 101 of the right hand at a distance 8 of a few centimeters apart from the touchscreen 2. The index finger 101 is positioned approximately perpendicular above a desired location on the touchscreen 2, such as a button, an icon, a control element, or a large touchscreen area. In FIG. 9, this part of the gesture sequence is shown on the left.

While the user holds the index finger 101 of the right hand steadily, the smartphone 1 is moved towards 105 the index finger 101, starting at time point t0, until the touchscreen 2 is in contact with the index finger 101 at the desired location at time point t2. This is shown in the middle of FIG. 9.

Starting at time point t3, the user moves the smartphone 1 downwards 106 again. As before, the index finger 101 of the right hand is not moved. The touchscreen 2 loses contact with the index finger 101 owing to the movement of the smartphone 1. After moving the smartphone 1 away from the index finger 101, the user stops the movement, keeping the smartphone 1 stationary again. At time point t5, the "inverse tap" gesture is completed.

From the perspective of the control unit 12 pursuant to the embodiment shown in FIG. 3, the "inverse tap" gesture is recognized as follows:

The touchscreen 2 indicates the beginning of a contact at time point t2 by triggering the touchscreen event "contact begin" 27. The event "contact begin" 27 is passed on unfiltered as a gesture event 21. In case the location of contact on the touchscreen 2 is relevant, that is, a button, an icon, a control element or a section of the touchscreen 2 is touched which accepts the "inverse tap" gesture as an input, the prior velocity curve 17 is calculated. This is done using the integrator 13, which calculates the velocity curve 17 from the current acceleration data 16 stored in the buffer 11. The velocity curve 17 is calibrated such that the velocity components X, Y, and Z are zero at time point t2, to compensate for possible drift of the integrator 13.

To distinguish between conventional and novel gestures and to classify the user input, the velocity 17 of the smartphone 1 at time point t1 is queried from the velocity curve 17. Time point t1 is obtained from the current time t2 minus the time offset "delta t" 31. In case of the "inverse tap" gesture, the following decision criteria are defined:

1st Criterion: The Z component "$v_z$" of the velocity 17 at time point t1 must be positive, and the absolute value of the Z component "$v_z$" must be greater than the threshold value for minimum velocity 23.

2nd Criterion: The magnitude of the X and Y components of velocity 17 at time point t1 must be less than the threshold value for negligible velocity 22.

As soon as the event "contact end" 28 is triggered by the touchscreen 2 at time point t3, the further course of velocity 17 is calculated in real time via continuous integration of the current acceleration values 16 using the integrator 13, the initial value of velocity 17 at time point t3 being set to zero.

The timer 15 triggers time point t4, which is obtained by adding the offset "delta t" 31 to time point t3. At time point t4, the corresponding velocity 17 is checked once again to classify the user input. In case of the "inverse tap" gesture, this is defined as follows:

3rd Criterion: The Z component "$v_z$" of the velocity 17 at time point t4 must be negative and the absolute value of the Z component "$v_z$" must be greater than the threshold value for minimum velocity 23.

4th Criterion: The magnitude of the X and Y components of velocity 17 at time point t4 must be less than the threshold value for negligible velocity 22.

In the case that all criteria are fulfilled, the "inverse tap" gesture is recognized and the control unit 12 triggers the corresponding gesture event "inverse tap recognized" 39 at time point t4. The conventional event "contact end" 28 from the touchscreen 2 is suppressed and is not output as a gesture event 21 owing to detection of the "inverse tap" gesture.

However, if at least one criterion does not apply, it is assumed that the current user input is not the "inverse tap" gesture, and in case the specific location on the touchscreen 2 supports further gestures of the novel type, the criteria for these gestures are now checked. If these criteria are not met either, a conventional touchscreen input is considered, and the retained touchscreen event "contact end" 28 received by the control unit 12 at time point t3 is passed on as gesture event 21 at time point t4.

In contrast to the "move-away" and "pull up" gestures, the "inverse tap" gesture features two measurable distances. The first distance 8 is derived from the position shift 18 between time point t0 and time point t2. The second distance 7 is derived from the position shift 18 between time point t3 and time point t5. This is done using the integrator 14 and by determining time point t0 and time point t5, respectively, as described above for the "move-away" and "pull up" gestures.

In case the user performs the "inverse tap" gesture symmetrically, as shown in FIG. 9, the distance 8 at the beginning of the gesture is approximately the same as the distance 7 at the end of the gesture. In this case, the measurement accuracy can be increased by calculating the average value between the first distance 8 and the second distance 7. The average distance is passed on to the application program ("app") as an input parameter using the gesture event "distance of inverse tap" 40 at time point t5.

Alternatively, the user may be instructed to perform the gesture "inverse tap" in an asymmetric manner, i.e., the first distance 8 is smaller or larger than the second distance 7. In that case, the difference between the first distance 8 and the second distance 7, which can be a positive or a negative value, is passed on to the application program ("app"). The asymmetric variant of the "inverse tap" gesture can be used for applications where a setting value or property is to be changed in two directions, such as a volume control.

Figure 10:
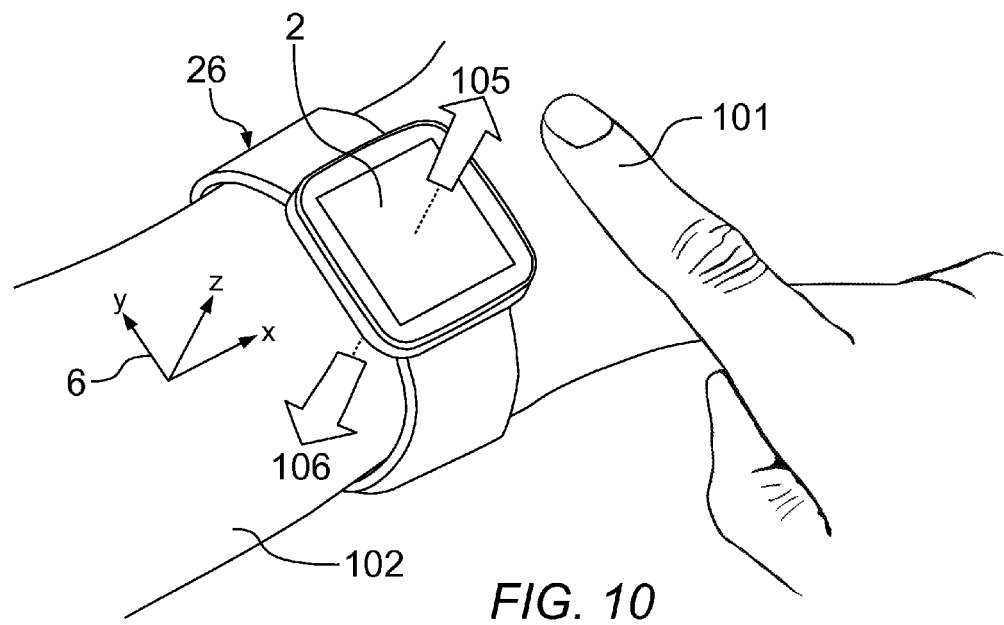
FIG. 10 shows how to perform the "move-away", "pull up", and "inverse tap" gestures with a smartwatch.
Figure 11:
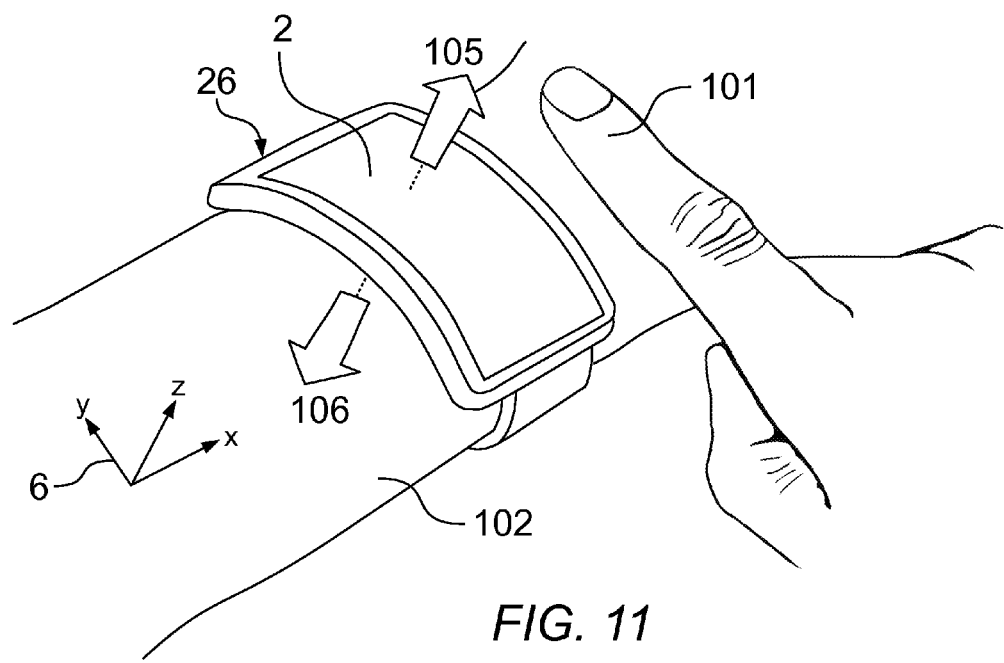
FIG. 11 shows the "move-away", "pull up", and "inverse tap" gestures performed with a smartwatch having a curved touchscreen.

FIG. 10 and FIG. 11 show by way of example that, instead of a smartphone 1, the novel gestures can also be used for the interaction with a smartwatch 26 equipped with a touchscreen 2. In this case, while the index finger 101 remains unmoved, the smartwatch 26 below the index finger 101 is moved upwards 105 and/or downwards 106 using the forearm 102 in order to establish and/or terminate contact of the index finger 101 with the touchscreen 2. In accordance with the shown coordinate system 6, the movement takes place along the Z-axis.

FIG. 10 shows a smartwatch 26 with a small, flat touchscreen 2, and FIG. 11 shows a smartwatch 26 with a larger, curved touchscreen 2. In both cases the "move-away", "pull up", and "inverse tap" gestures, as well as other variations can be used. Typically, in the case of a curved touchscreen 2 pursuant to FIG. 11, the direction of movement is approximately perpendicular to the desired location on the touchscreen 2.

Since the gestures "move-away", "pull up", and "inverse tap" can be distinguished from conventional gestures, they can be used for global functions of an operating system. In this case, the novel gestures are not tied to current buttons, icons, or control elements. Instead, in such an embodiment, the novel gestures are accepted and detected at each location on the entire touchscreen 2, regardless of any conventional buttons, icons, or control elements displayed on the touchscreen 2. Even if such a conventional button, icon, or control element is touched while performing the "move-away", "pull up", or "inverse tap" gesture, the conventional action associated with this button, icon, or control element is not triggered. Instead, the global functions associated with each of the gestures "move-away", "pull up", and "inverse tap" are triggered.

For example, "move-away", "pull up", and "inverse tap" could individually trigger one of the following tasks as a global gesture: A running process is interrupted, e.g., a data transfer or a calculation; the current application program ("app") is terminated, moved, or switched; a running application program ("app") is minimized or maximized; a running application program ("app") is moved to the background or foreground; the user returns to the main menu or home screen of the operating system; a search function is executed, e.g., an input screen for a search engine is displayed; a telephone call is accepted or terminated; the lock screen is enabled or disabled; or the order of elements or objects is changed.

Furthermore, while performing the gestures "move-away", "pull up", and "inverse tap", the time span between t2 and t3, in which the finger 101 is in contact with the touchscreen 2, can be varied. By distinguishing between a short time span and a longer time span, the three novel gestures can be extended to six gestures: each as a variant involving a brief touch and an extended touch.

Figure 12:
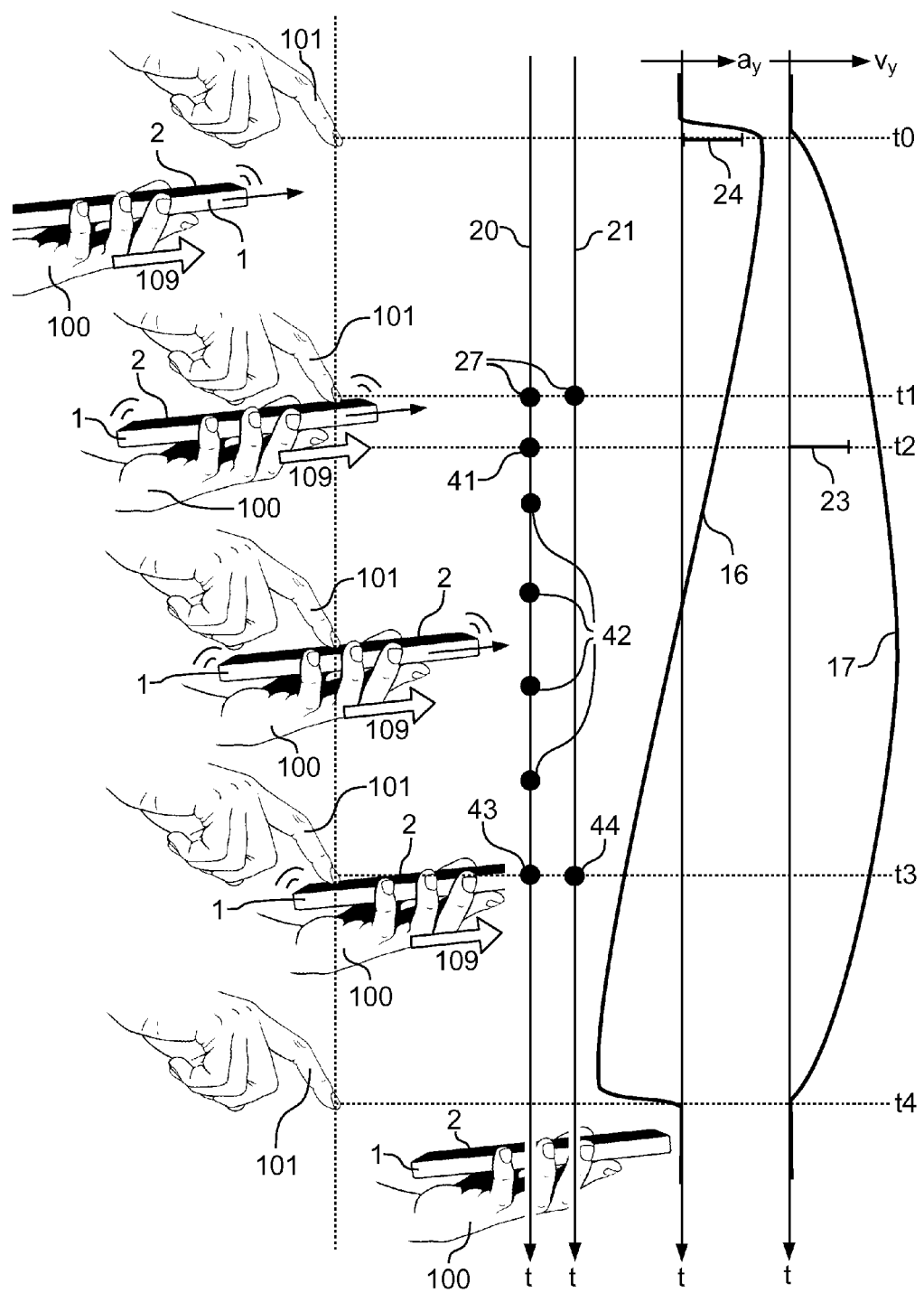
FIG. 12 illustrates the novel "drag-along" gesture with corresponding curves and events.

FIG. 12 shows the novel gesture "drag-along", which is characterized in that the smartphone 1 is shifted under the unmoved finger 101, while the finger 101 drags over the touchscreen 2.

The left part of FIG. 12 shows the course of the gesture using the example of a smartphone 1 held in the left hand 100. The touchscreen 2 is touched with the index finger 101 of the right hand. The chronological sequence of the gesture is to be interpreted from top to bottom corresponding to the time axis t.

Furthermore, FIG. 12 shows the touchscreen events 20, which are processed by the control unit 12, and the gesture events 21, which are triggered by the control unit 12. The curves show the corresponding acceleration 16 ("$a_y$") and velocity 17 ("$v_y$") in an idealized manner. The acceleration curve 16 represents the values of the accelerometer 3 compensated for gravity. Based on the coordinate system 6 defined in FIG. 1, the illustrated curves represent the Y component, and because in the present example, the movement of the smartphone 1 takes place in only one direction, the values of the X and Z components are assumed to be near zero and are not shown.

From the user's perspective, for purpose of example only, the "drag-along" gesture is performed as follows:

The user holds the index finger 101 of his right hand on a spot at a location outside the touchscreen 2 at a height that lies approximately in the plane of the touchscreen 2. At time point t0, the user starts to shift 109 the smartphone 1 essentially in the plane of the touchscreen 2 so that the smartphone 1 gets below the unmoved index finger 101. At time point t1, the touchscreen 2 is in contact with the index finger 101.

While the index finger 101 touches the touchscreen 2, the user continues to shift 109 the smartphone 1 with the left hand 100 below the unmoved index finger 101, which is held in place, so that the index finger 101 drags over the touchscreen 2 owing to movement of the smartphone 1. In the example shown in FIG. 12, the smartphone 1 is pulled forward along the Y-axis.

As soon as the desired end is reached, the user terminates contact between the index finger 101 and the touchscreen 2 at time point t3, while continuing to shift 109 the smartphone 1 in the plane of the touchscreen 2. Finally, at time point t4, the user stops the movement of the smartphone 1.

Contact at time point t1 can be initiated by slightly lowering the index finger 101 and/or by slightly lifting the smartphone 1. Similarly, contact can be terminated at time point t3 by slightly lifting the index finger 101 and/or by slightly lowering the smartphone 1.

The position of contact start at time point t1 and/or contact end at time point t3 can be located anywhere on the touchscreen 2. In addition, it is possible that the beginning and/or end of contact takes place at the edge of the touchscreen 2, e.g., the user may shift the smartphone 1 under the unmoved index finger 101 beyond the edge of the touchscreen 2 such that the index finger 101 loses contact with the touchscreen 2 at the edge. In case the beginning of contact takes place at the opposite edge, the unmoved index finger 101 may drag over the entire length or width of the touchscreen 2.

FIG. 12 shows a variant of the "drag-along" gesture with the index finger 101 located outside the touchscreen 2 at the beginning and end of the gesture. This is typical for small touchscreens 2 such as those used in small smartphones 1 or smartwatches 26. In case the touchscreen 2 is adequately large, it is also possible that the touchscreen 2 is already located below the unmoved index finger 101 at the beginning of the gesture and/or is still located below the unmoved index finger 101 at the end of the gesture.

From the perspective of the control unit 12 pursuant to the embodiment shown in FIG. 3, the "drag-along" gesture is recognized as follows:

The touchscreen 2 indicates the beginning of a contact at time point t1 by triggering the touchscreen event "contact begin" 27. The event "contact begin" 27 is passed on unfiltered as a gesture event 21. Shortly thereafter, the touchscreen 2 triggers the event "drag" 41 owing to shifting 109 of the smartphone 1 below the unmoved index finger 101.

In case the location of contact on the touchscreen 2 is relevant, that is, a section of the touchscreen 2 is touched, which accepts the "drag-along" gesture as an input, the prior acceleration curve 16 located in the buffer 11 is evaluated. For this purpose, the acceleration curve 16 is smoothed to reduce possible noise from the acceleration sensor 3. Next, the time point t0 at which the acceleration started is determined, for example, by scanning the acceleration curve 16 backwards, starting at t1 as the starting point, until a maximum is found whose magnitude is greater than the threshold value for minimum acceleration 24. As soon as t0 is known, the velocity curve 17 is calculated for the interval between t0 and t2 using the integrator 13, the initial value of velocity 17 at time point t0 being set to zero.

Figure 14:
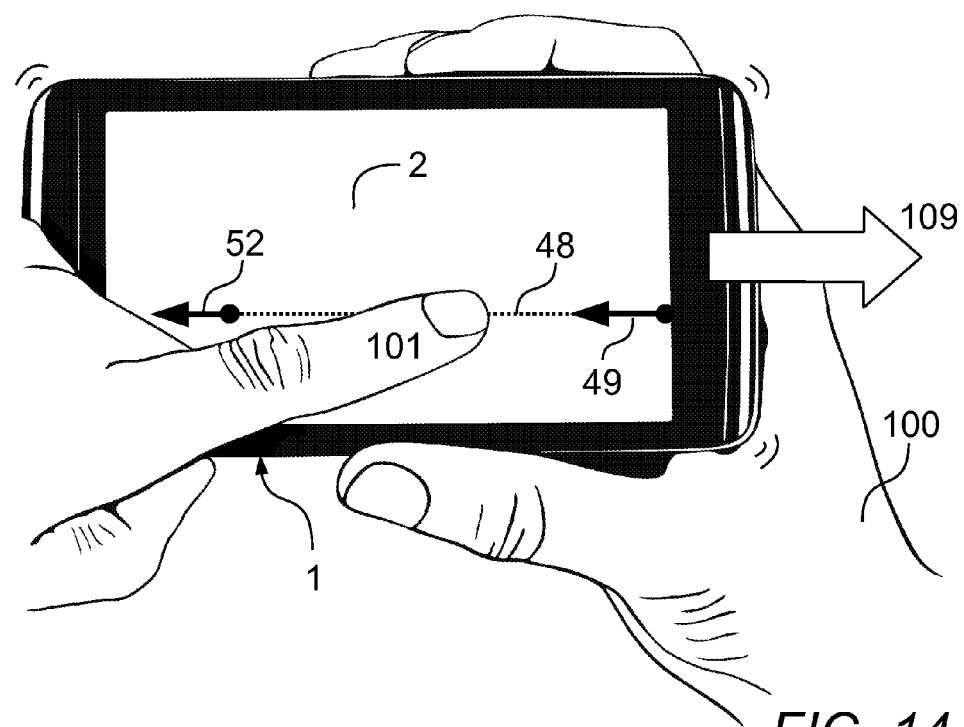
FIG. 14 illustrates the displacement of a smartphone below a stationary finger lengthwise to the touchscreen.
Figure 15:
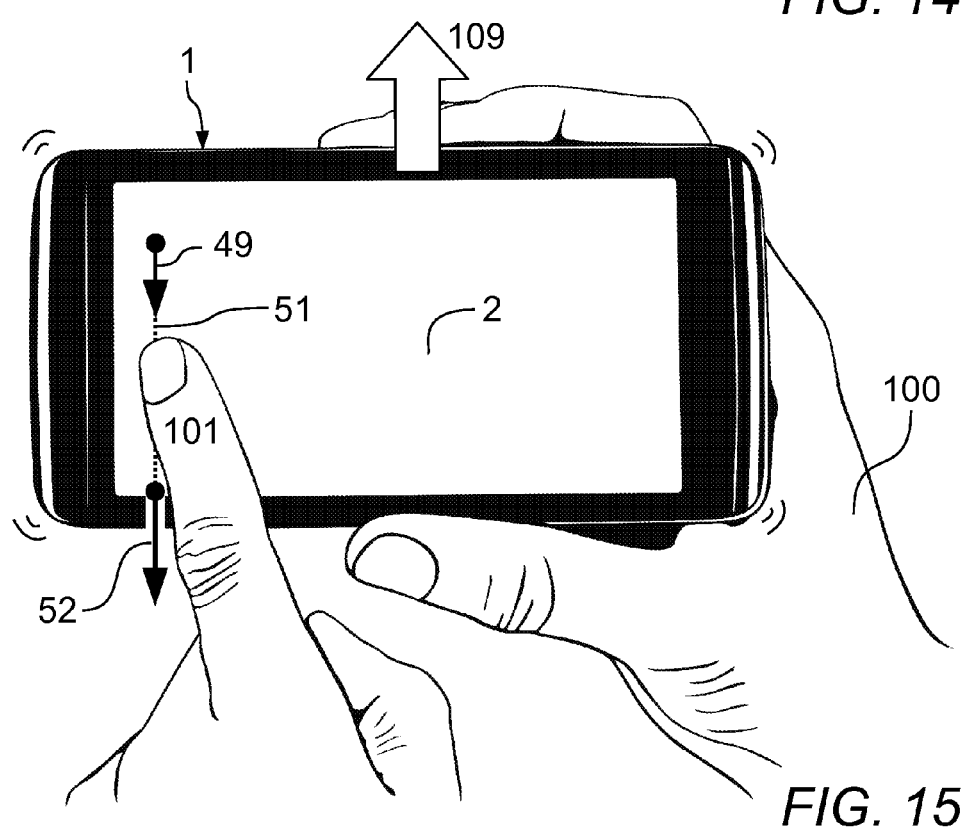
FIG. 15 illustrates the displacement of a smartphone below a stationary finger crosswise to the touchscreen.

After the initial "drag" event 41, owing to continued shifting 109 of the smartphone 1 below the unmoved index finger 101, the touchscreen 2 triggers one or more "drag delta" events 42. Depending on the embodiment, the "drag" 41 and/or the "drag delta" 42 event will provide a two-dimensional delta vector 49 that specifies the relative direction in which the index finger 101 is dragged over the touchscreen 2, as shown in FIG. 14 and FIG. 15.

With continued reference to FIG. 12, at time point t2, the velocity curve 17 and the delta vector 49 are checked against the following criteria for identifying the "drag-along" gesture:

1st Criterion: The magnitude of velocity 17 at time point t2 must be greater than the threshold value for minimum velocity 23.

2nd Criterion: The direction of the velocity vector 17 at time point t2 must be in the X-Y plane, i.e., the plane of the touchscreen 2. It can be checked whether the Z component of the velocity 17 at time point t2 is smaller than the threshold value for negligible velocity 22.

3rd Criterion: The velocity vector 17 at time point t2 must be oriented in the direction opposite to the delta vector 49 reported by the touchscreen 2, an empirically determined tolerance being permitted.

Optionally, a further decision criterion may evaluate to what extent the speed of the drag movement detected by the touchscreen 2 fits the velocity 17 of the smartphone 1. If the user performs the gesture "drag-along" in a proper manner, the magnitude of the speed between the sliding finger 101 and the touchscreen 2 must comply with the magnitude of the velocity 17 of the smartphone 1, a tolerance being permitted.

In the case that at least one criterion is not met, the user input is interpreted as a conventional drag gesture, and the "drag" and/or "drag delta" events 41, 42 are passed on as gesture events 21 starting at time point t2.

Otherwise, in the case that all criteria are fulfilled, the gesture "drag-along" is recognized and the "drag" and/or "drag delta" events 41, 42 from the touchscreen 2 are suppressed and are not forwarded as gesture events 21. This is done to ensure that an application program ("app") does not react to the "drag" and/or "drag delta" events 41, 42 in a conventional manner such as page scrolling. At time point t3, the touchscreen 2 triggers a final "flick" event 43, as, in relative terms, the index finger 101 leaves the touchscreen 2 in full motion. Since all criteria are fulfilled, the control unit 12 now triggers the gesture event "drag-along recognized" 44. The information provided by the touchscreen 2 such as the direction 52 and speed of the "flick" event 43 can be handed over to the application program ("app") as parameters. Examples for directions 52 reported by the "flick" event 43 are shown in FIG. 14 and FIG. 15.

Alternatively, it is also possible to trigger the gesture event "drag-along recognized" 44 at time point t2 already or at any time between t2 and t3 without waiting for the final "flick" event 43 at time point t3.

Figure 13:
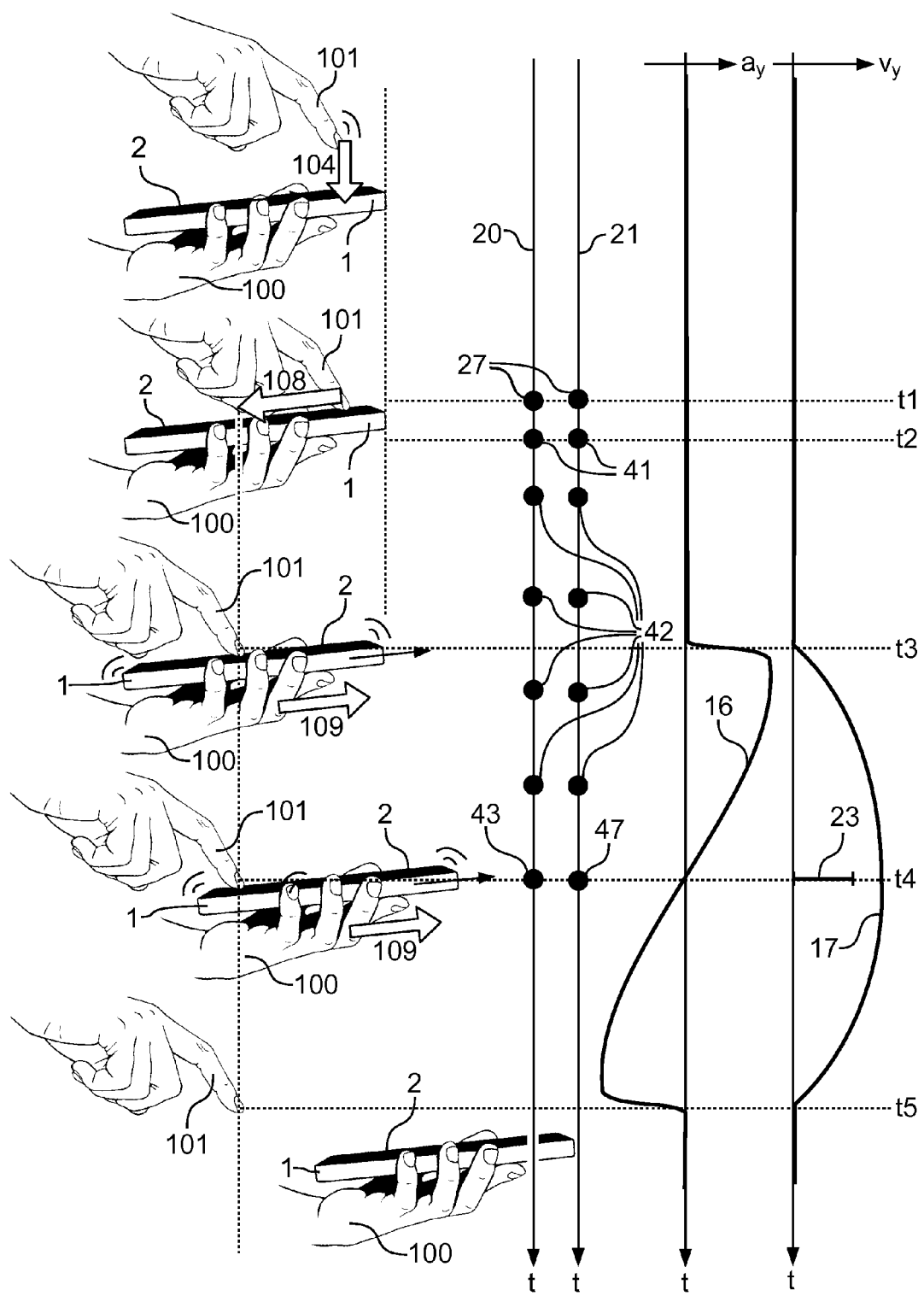
FIG. 13 illustrates the novel "drag-away" gesture with corresponding curves and events.

FIG. 13 shows the novel gesture "drag-away". This gesture extends the conventional drag gesture by means of an alternative gesture completion, in addition to the known completions "drag completed" (remove finger from touchscreen 2 at no motion) and "flick" (remove finger from touchscreen 2 in full motion). Except for the specific gesture sequence, the general description pursuant to FIG. 12 applies.

From the users perspective, for purpose of example only, the "drag-away" gesture is performed as follows:

First, the user has the option to perform a conventional drag gesture, e.g., by holding the smartphone 1 stationary with the left hand 100 and dragging the index finger 101 of the right hand over the touchscreen 2. FIG. 13 shows (between time point t2 and t3) how the index finger 101 slides 108 from the upper area of the touchscreen 2 to a position near the center. For instance, the user may scroll through a page. So long as the user maintains contact between the index finger 101 and the touchscreen 2, he/she can also change the direction of the drag movement, i.e., the direction of page scrolling.

Performing the aforementioned conventional drag gesture is optional. Instead, in case a drag gesture is not required in the current situation, e.g., no need to scroll through a page, it is sufficient to touch the touchscreen 2 without a drag movement. Based on the present invention, the user now has three options to terminate the gesture at time point t3:

1st Option: This involves a conventional gesture end, in which the user removes the finger 101 from the touchscreen 2 when the smartphone 1 is essentially stationary. In case the user performs the aforementioned conventional drag movement by changing the position of the finger 101 on the touchscreen 2, the resulting gesture is a simple drag gesture, which is typically reported by issuing a "drag completed" event. In case the user does not drag the finger 101 over the touchscreen 2, the resulting gesture is a tap or press gesture, which is typically reported by issuing a "contact end" event 28.

2nd Option: This involves a conventional gesture end by performing a flick movement, in which the user removes the finger 101 from the touchscreen 2 in full motion, while still sliding over the touchscreen 2, the smartphone 1 being essentially stationary. The result is a conventional flick gesture, which is typically recognized by issuing a "flick" event 43.

3rd Option: This constitutes a novel gesture end called "drag-away", pursuant to FIG. 13. While touching the touchscreen 2, the user holds the index finger 101 steady at a spot, and at time point t3, the user starts to shift 109 the smartphone 1 with the left hand 100 under the unmoved index finger 101 without breaking the contact with the touchscreen 2. At time point t4, while the smartphone 1 is still in full motion, the user removes the index finger 101 from the touchscreen 2. Alternatively, the user can continue to shift 109 the smartphone 1 under the unmoved index finger 101 until the index finger 101 is beyond the edge of the touchscreen 2. At time point t5, the user stops movement of the smartphone 1 with the left hand 100.

From the perspective of the control unit 12 pursuant to the embodiment shown in FIG. 3, the "drag-away" gesture is recognized as follows:

The touchscreen 2 indicates the beginning of a contact at time point t1 by triggering the touchscreen event "contact begin" 27. The event "contact begin" 27 is passed on unfiltered as a gesture event 21. Next, in case the touchscreen 2 reports "drag" and/or "drag delta" events 41, 42, and if the criteria for the novel gesture "drag-along", as described above, are not met, the user performs a conventional drag gesture, and the "drag" and/or "drag delta" events 41, 42 are forwarded as gesture events 21 by the control unit 12.

As soon as the user performs the novel "drag-away" gesture, the touchscreen 2 triggers a "flick" event 43 due to the relative movement 109 of the smartphone 1 below the unmoved finger 101, which complies with an end of contact at full motion. The "flick" event 43 reports a flick direction 52, as depicted in FIG. 14. In case the corresponding touchscreen area supports and accepts the "drag-away" gesture, a velocity curve 17 is calculated for the interval between t2 and t4 using the integrator 13, the initial value of velocity 17 at time point t2 being set to zero. At time point t4, the velocity curve 17 and the flick direction 52 are checked against the following criteria for identifying the "drag-away" gesture:

1st Criterion: The magnitude of velocity 17 at time point t4 must be greater than the threshold value for minimum velocity 23.

2nd Criterion: The direction of the velocity vector 17 at time point t4 must be in the X-Y plane, i.e., the plane of the touchscreen 2. It can be checked whether the Z component of the velocity 17 at time point t4 is smaller than the threshold value for negligible velocity 22.

3rd Criterion: The velocity vector 17 at time point t4 must be oriented in the direction opposite to the flick direction 52 reported by the touchscreen 2, an empirically determined tolerance being permitted.

Optionally, a further decision criterion may evaluate to what extent the speed of the drag movement detected by the touchscreen 2 fits the velocity 17 of the smartphone 1. If the user performs the gesture "drag-away" in a proper manner, the magnitude of the speed between the sliding finger 101 and the touchscreen 2 must comply with the magnitude of the velocity 17 of the smartphone 1, a tolerance being permitted.

In the case that all criteria are fulfilled, the "flick" event 43 from the touchscreen 2 is suppressed and is not forwarded as a gesture event 21. Instead, the gesture event "drag-away recognized" 47 is triggered by the control unit 12 at time point t4. The information provided by the touchscreen 2 such as the direction 52 and speed of the "flick" event 43 can be handed over to the application program ("app") as parameters.

However, if at least one criterion does not apply, it is assumed that the current user input is not the "drag-away" gesture, and the control unit 12 passes on the conventional "flick" event 43 as a gesture event 21 at time point t4.

It should be noted that the example illustrated in FIG. 13 shows a gesture sequence which includes the optional conventional drag movement with the index finger 101 at the beginning. As mentioned above, it is possible to omit the conventional drag gesture in the interval between time point t2 and time point t3, e.g., in case it is not intended to scroll through a page. In this case, if the user performs merely the "drag-away" gesture, a "drag" event 41 caused by the relative displacement 109 of the smartphone 1 below the unmoved index finger 101 will occur at time point t3. The remaining steps with regard to recognition of the "drag-away" gesture are identical.

Depending on the embodiment of the touchscreen 2 and on the relative speed between the finger 101 and the touchscreen 2, it is also possible that the touchscreen 2 triggers a single "flick" event 43 without a preceding "drag" or "drag delta" event 41, 42. Even in this case, it is possible to recognize the "drag-away" gesture because the analysis that distinguishes between a conventional gesture and the novel "drag-away" gesture is initiated by the "flick" event 43 and not by the "drag" or "drag delta" events 41, 42. Forwarding the events "contact begin" 27, "drag" 41, and "drag delta" 42 is needless in this case because these events are not triggered by the touchscreen 2.

FIG. 14 and FIG. 15 show, for purpose of example only, that the novel gestures "drag-along" and "drag-away", as well as other variants can be performed in any direction in the X-Y plane of the touchscreen 2.

In FIG. 14, the dotted line 48 shows the relative drag movement on the touchscreen 2 when performing the "drag-along" gesture. The round dots mark the beginning and end of contact of the index finger 101 on the touchscreen 2. In this example, the beginning of contact is located at the edge of the touchscreen 2. The relative direction of the drag movement, recognized by the touchscreen 2, is reported by the initial delta vector 49, as the smartphone 1 is being shifted under the unmoved index finger 101 in the opposite direction 109. Finally, at the end of contact, a "flick" event 43 is triggered by the touchscreen 2, which reports the flick direction 52.

In FIG. 15, the dotted line 51 illustrates a "drag-along" or "drag-away" gesture crosswise to the touchscreen 2, and this gesture ends at the edge of the touchscreen 2. Once more, the initial delta vector 49 reported by the touchscreen 2 is oriented in the direction opposite to the movement 109 of the smartphone 1. As soon as the finger 101 reaches the edge of the touchscreen 2, owing to the movement 109 of the smartphone 1, a "flick" event 43 is triggered by the touchscreen 2, which reports the flick direction 52.

Furthermore, it is possible to perform the "drag-along" and "drag-away" gestures, as well as other variants, in the opposite direction, in diagonal directions, or in any other shape such as a circle, semicircle, or zigzag course.

Figure 16:
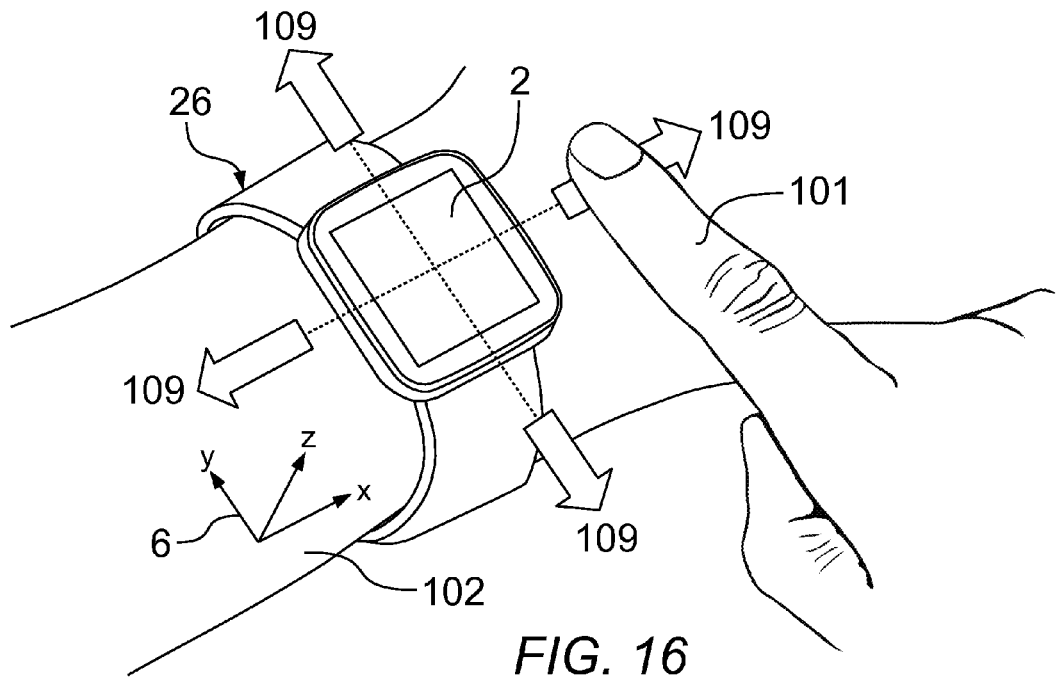
FIG. 16 shows how to perform the "drag-along" and "drag-away" gestures with a smartwatch.

FIG. 16 shows by way of example that the novel "drag-along" and "drag-away" gestures can be used for interaction with a smartwatch 26 as well. In this case, the smartwatch 26 below the unmoved index finger 101 is shifted 109 with the forearm 102, while the unmoved index finger 101 slides over the touchscreen 2. In accordance with the depicted coordinate system 6, shifting the smartwatch 26 takes place in the X-Y plane.

Depending on the application, the gestures "drag-along" and/or "drag-away" can be recognized by a specific control element or touchscreen region as a local function. Alternatively, because the gestures "drag-along" and "drag-away" can be distinguished from conventional gestures, they can be used for global operating system functions. In this embodiment, the gestures are accepted and detected at each location on the entire touchscreen 2, regardless of any conventional buttons, icons, or control elements.

For example, "drag-along" and "drag-away" could individually trigger one of the following tasks as a global gesture: A running process is interrupted, e.g., a data transfer or a calculation; the current application program ("app") is terminated, moved, or switched; the user returns to the main menu or home screen of the operating system; or the lock screen is enabled or disabled.

In addition, the novel gestures "drag-along" and/or "drag-away" can be used, for instance, in an e-book reader app: In case the user performs a conventional flick gesture or in case the user completes a drag gesture with a conventional flick movement, the pages of the e-book are scrolled kinetically. However, if the user performs the novel "drag-along" gesture or the novel "drag-away" gesture, it could flip the e-book's pages to the next or the previous chapter, depending on the direction of the gesture. Alternatively, the pages of the e-book could jump to the next or previous paragraph, to the next or previous page, or to the beginning or end of the book. Similar functions can be implemented in a text editor or a web browser.

Furthermore, by way of example, the novel "drag-along" and/or "drag-away" gestures can be used for a media player.

By performing the gesture "drag-along" or "drag-away", the user could leap forward and/or backward during the playback of an audio or video recording. In case the media player plays audio or video recordings from a playlist, the user could skip to the next or previous recording in the playlist by performing the "drag-along" or "drag-away" gesture in an appropriate direction.

Finally, it is possible to change the order of elements in a list or to change the order of pages, cards, or tabs using the "drag-along" and/or "drag-away" gestures. While conventional gestures such as a drag or flick movement may be used to switch between several elements, several pages, several cards, or several tabs, the novel gestures "drag-along" and "drag-away" could be used to sort them.

Figure 17:
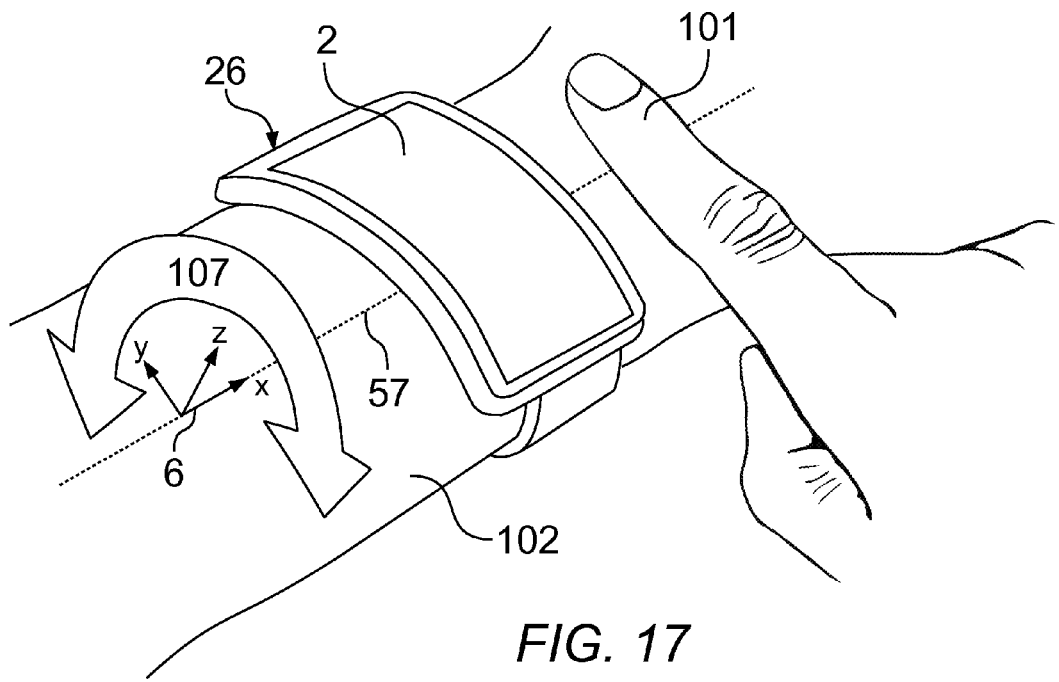
FIG. 17 shows the novel "forearm-spin" gesture performed with a smartwatch having a curved touchscreen.

FIG. 17 shows the novel gesture "forearm-spin". This gesture, which uses a smartwatch 26 with a curved touchscreen 2, is a variant of the "drag-along" and "drag-away" gestures. Instead of shifting the smartwatch 26 in the X-Y plane of the touchscreen 2 by moving the forearm 102, the smartwatch 26 is rotated around the X-axis by twisting 107 the forearm 102, while the index finger 101 is held in place. In FIG. 17, the axis of rotation 57 is shown as a dotted line, and it corresponds with the X-axis of the depicted coordinate system 6.

Figure 18:
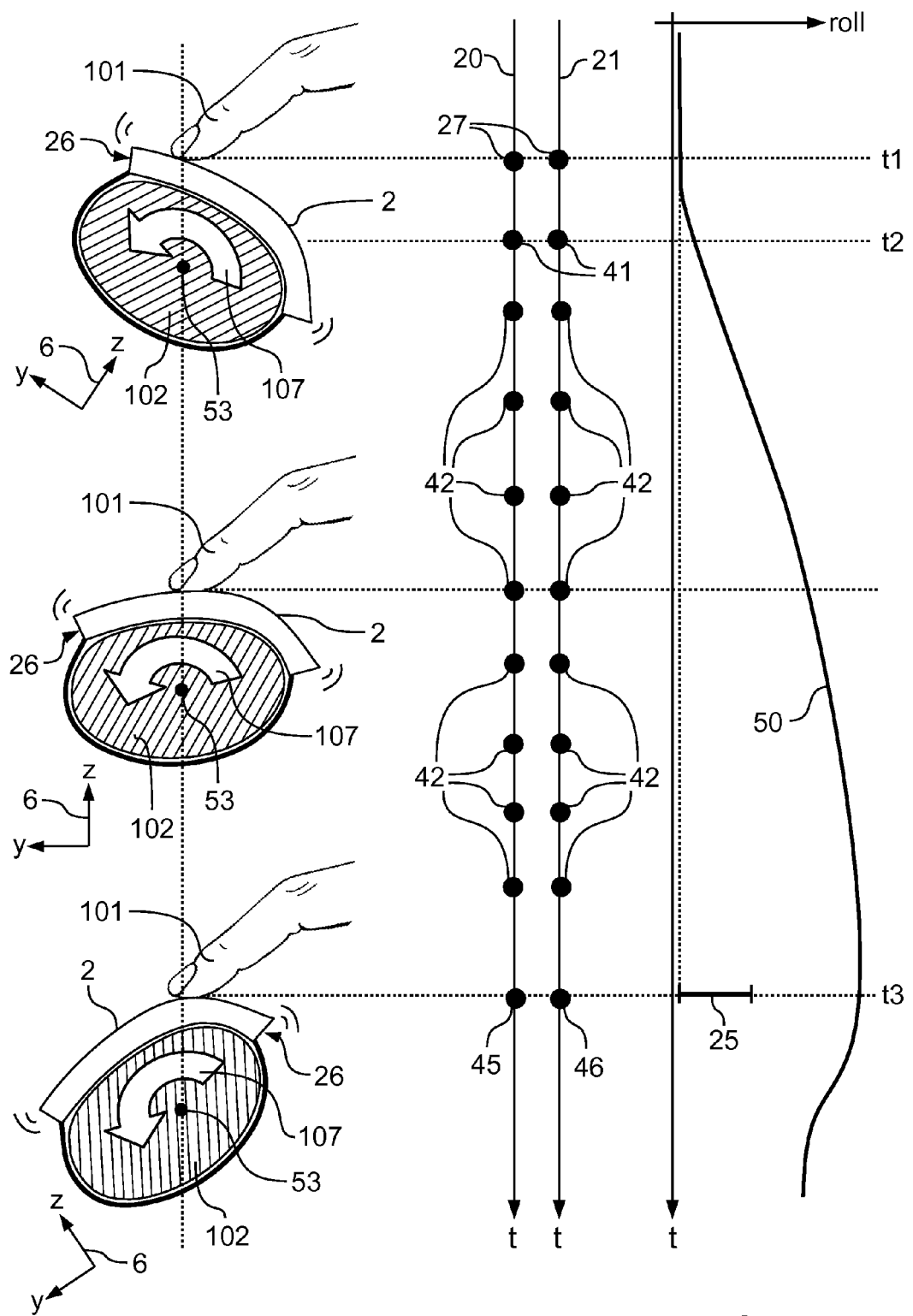
FIG. 18 illustrates the novel "forearm-spin" gesture with corresponding curve and events.

With reference to FIG. 18, which shows the chronological sequence of the "forearm-spin" gesture, rotation takes place around the pivot point 53. Furthermore, FIG. 18 shows the touchscreen events 20, which are processed by the control unit 12, and the gesture events 21, which are triggered by the control unit 12. The chronological sequence of the gesture is to be interpreted from top to bottom corresponding to the time axis t.

Based on the embodiment pursuant to FIG. 3, the sensor unit is comprised of a 3-axis gyroscope 4 and a 3-axis magnetometer 5, whose measurements are combined with each other using combined motion analysis 10 to compensate for the drawbacks of the individual sensors. The combined motion analysis 10 may calculate the spatial orientation of the smartwatch 26 as roll, pitch, and yaw angles. This is known from prior art.

Corresponding to the twist of the forearm 102 the roll angle curve 50 shown in FIG. 18 represents the rotation angle around the X-axis in an idealized manner. Because the "forearm-spin" gesture deals only with a rotation around the X-axis, the rotation angles around the Y- and Z-axis (pitch and yaw) are irrelevant and are not shown.

From the user's perspective, for purpose of example only, the "forearm-spin" gesture is performed as follows:

At time point t1, the user touches the curved touchscreen 2 with the index finger 101 and next, at time point t2, the user starts to twist 107 his/her forearm 102 while maintaining the index finger 101 steady. As a result, owing to the relative movement, the index finger 101 slides over the curved touchscreen 2 in a manner comparable to the "drag-along" and "drag-away" gestures.

Finally, at time point t3, the user stops rotation 107 of the forearm 102 and removes the index finger 101 from the touchscreen 2. The "forearm-spin" gesture is then completed.

From the perspective of the control unit 12 pursuant to the embodiment shown in FIG. 3, the "forearm-spin" gesture is recognized as follows:

The touchscreen 2 indicates the beginning of a contact at time point t1 by triggering the touchscreen event "contact begin" 27. The event "contact begin" 27 is passed on unfiltered as a gesture event 21. Shortly thereafter, at time point t2, the touchscreen 2 triggers the event "drag" 41 owing to the rotation 107 of the smartwatch 26 below the unmoved index finger 101. The "drag" event 41 and the subsequent "drag delta" events 42 are forwarded as gesture events 21, too.

Triggered by the initial "drag" event 41, at time point t2, the current roll angle 50 determined by combined motion analysis 10 is temporarily stored as a reference value.

At time point t3, pursuant to FIG. 18, the touchscreen 2 triggers the event "drag completed" 45. Alternatively, the touchscreen 2 may trigger the event "flick" 43 if the user removes the finger 101 from the touchscreen 2 while still twisting 107 the forearm 102. In either case, at time point t3, the roll angle 50 is queried once again, and the difference between the current roll angle 50 and the temporarily stored reference value is calculated.

If the absolute value of the difference between the roll angles 50 is larger than the threshold value for minimum rotation 25 and if the direction reported by the "drag" 41, "drag delta" 42 and/or "flick" 43 events points in the opposite direction of the rotation 107, the gesture "forearm-spin" is recognized, and the control unit 12 triggers the corresponding gesture event "forearm-spin recognized" 46 at time point t3. The conventional events "drag completed" 45 or "flick" 43 from the touchscreen 2 are suppressed and are not output as gesture events 21 because the gesture "forearm-spin" has been detected instead. The information provided by the touchscreen 2 such as the distance and speed of the drag movement on the curved touchscreen 2, as well as the difference in the roll angles 50 at t2 and t3, can be handed over to the application program ("app") as parameters.

However, if the absolute value of the difference between the roll angles 50 is smaller than the threshold value for minimum rotation 25, it is assumed that the current user input is not the "forearm-spin" gesture, and the conventional touchscreen event "drag completed" 45 or "flick" 43 is passed on as gesture event 21 at time point t3.

The threshold value for minimum rotation 25 is defined as a positive value and can be determined empirically. In case of the gesture "forearm-spin", an adequately large threshold value should be selected such that an unintentional twist of the forearm 102 during the input of conventional gestures is not interpreted as the "forearm-spin" gesture.

Alternatively or additionally to the threshold value for minimum rotation 25 it is possible to evaluate whether the rotational speed of the forearm 102 meets an appropriate decision criterion: E.g., if the speed of the rotation around the X-axis determined by the gyroscope 4 or the combined motion analysis 10 and/or the opposite speed of the sliding finger 101 on the touchscreen 2 reported by the "drag delta" events 42, exceed a defined threshold value at any one time between the "drag" event 41 at time point t2 and the "drag completed" or "flick" event 45, 43 at time point t3, the gesture "forearm-spin" is recognized and the control unit 12 triggers the corresponding gesture event "forearm-spin recognized" 46 at time point t3. So, whenever the user twists his/her forearm 102 with an adequate speed while touching the touchscreen 2 with a steady finger 101 he/she is able to input the gesture "forearm-spin". Otherwise, if the rotational speed is below the threshold value, the input is interpreted as a conventional gesture.

Optionally, a further decision criterion may evaluate to what extent the speed of the sliding finger 101 on the touchscreen 2 fits the rotational speed of the forearm 102. E.g., if the user performs the gesture "forearm-spin" in a proper manner, the magnitude of the speed between the sliding finger 101 and the touchscreen 2 must comply with the magnitude of the rotational speed around the X-axis, a tolerance being permitted.

The novel "forearm-spin" gesture can be executed in two directions, that is, a twist 107 of the forearm 102 in the clockwise and counterclockwise directions. Optionally, the direction of the gesture can be assigned to different functions.

For example, the "forearm-spin" gesture could trigger one of the following tasks: The order of elements, pages, cards, or tabs is changed or sorted; the scroll capability of a page, card, or tab is locked or unlocked; the current application program ("app") is moved or switched; the user returns to the main menu or home screen of the operating system; or the lock screen is enabled or disabled.

Figure 19:
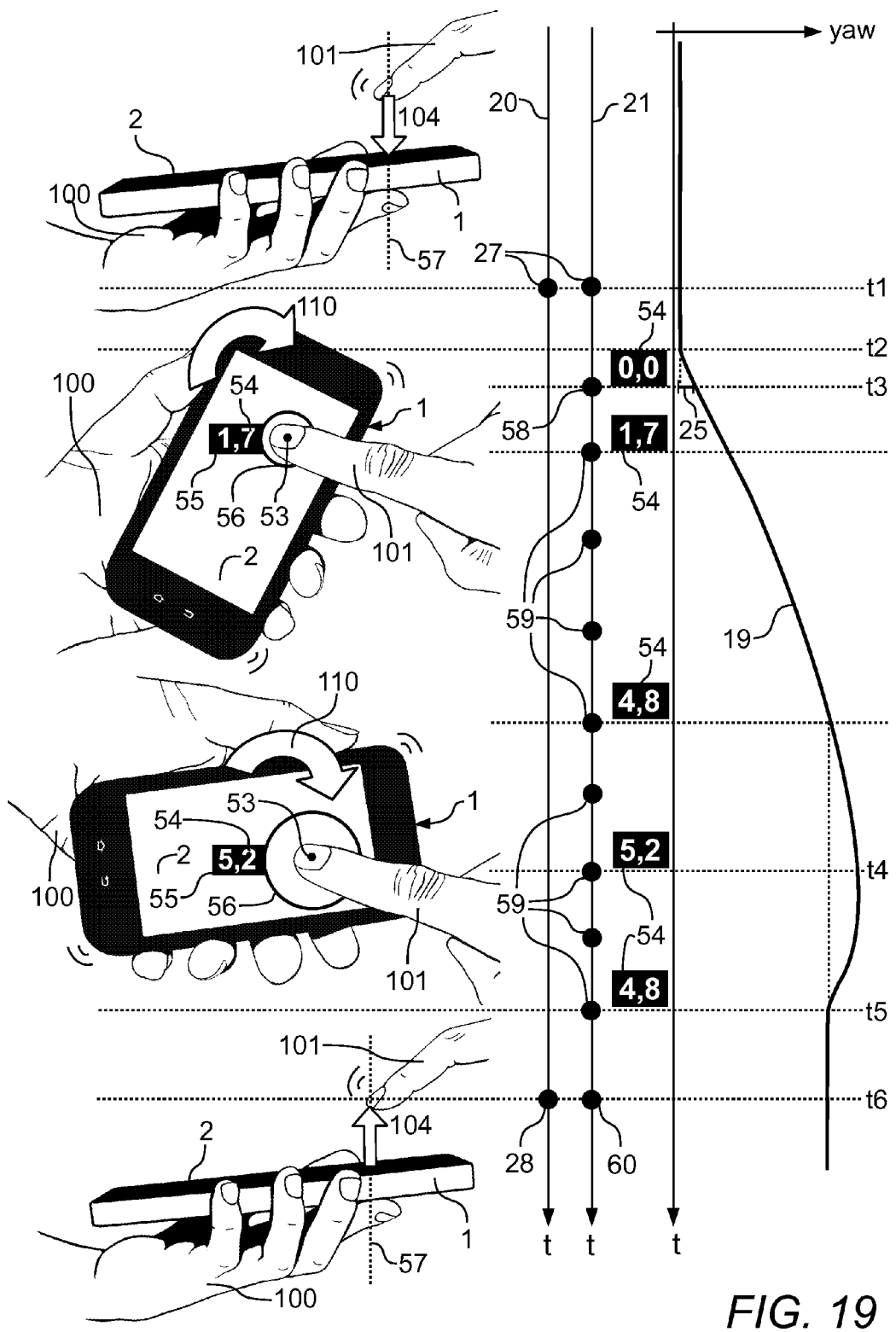
FIG. 19 illustrates the novel "turn-setting" gesture with corresponding curve and events.

FIG. 19 shows the novel "turn-setting" gesture, which can be used inter alia for the rotation of objects, for the adjustment of values and for the modification of properties. A particular feature of the "turn-setting" gesture is the option to touch the touchscreen 2 with a single finger 101 while rotating the smartphone 1 under this finger 101, the contact point of the finger 101 being the pivot point 53.

Notably, this differentiates the "turn-setting" gesture from conventional gestures intended for the rotation of objects, which typically require two fingers 101 to be in contact with the touchscreen 2 to determine the necessary reference points for the rotation angle. Among others, the option to use just one finger 101 has the advantage that it allows the user to rotate or modify many very small icons or control elements on the touchscreen 2, which are too small to be manipulated with two fingers without simultaneously touching neighboring elements.

The course of the gesture is shown on the left side of FIG. 19 using the example of a smartphone 1, which is held in the left hand 100 and whose touchscreen 2 is operated with the index finger 101 of the right hand. For clarity, the smartphone 1 is shown in a side view in the top and bottom drawings, and in between, the smartphone 1 is shown in a top-down view. Regardless of the different perspectives, the illustrations refer to the performance of a single gesture, of which the chronological sequence is to be interpreted from top to bottom corresponding to the time axis t. Furthermore, FIG. 19 shows the touchscreen events 20, which are processed by the control unit 12, and the gesture events 21, which are triggered by the control unit 12.

The combined motion analysis 10 pursuant to FIG. 3 calculates the spatial orientation of the smartphone 1 as roll, pitch, and yaw angles. The yaw curve 19 shown in FIG. 19 represents the rotation angle around the Z-axis in an idealized manner. Because the illustrated exemplary "turn-setting" gesture deals only with rotation around the Z-axis, the rotation angles around the X- and Y-axis (roll and pitch) are irrelevant and are not shown.

From the users perspective, for purpose of example only, the "turn-setting" gesture is performed as follows:

The user holds the smartphone 1 with the left hand 100, and at time point t1, he/she uses the index finger 101 of the right hand to touch a control element, which supports the "turn-setting" gesture. At time point t2, the user starts rotating the smartphone 1 with the left hand 100 under the unmoved index finger 101 of the right hand, while maintaining continual contact of the index finger 101 with the touchscreen 2. In the example shown in FIG. 19, the rotation is in the clockwise direction 110, and the contact point of the index finger 101 on the touchscreen 2 corresponds to pivot point 53; that is, the index finger 101 slides on the pivot point 53. The rotation takes place around the Z-axis of the coordinate system 6. The rotation axis 57 is plotted as a dotted line in the top and bottom drawings of FIG. 19.

Depending on the intended application, the rotation of the smartphone 1 leads to the modification of a graphical element and/or an adjustable value 54. For example, FIG. 19 shows the modification of an adjustable numeric value 54 displayed in a labeling field or tab 55, which is attached to an animated circle 56 that surrounds the pivot point 53, i.e., the contact point of the finger 101. Furthermore, during the rotation of the smartphone 1, the size of the animated circle 56 is modified.

So long as the user maintains contact with the touchscreen 2, the user is also able to modify the adjustable numeric value 54 or the graphical element in the opposite direction by rotating the smartphone 1 backward. For instance, FIG. 19 shows at time point t4 as to how an unintentional numeric value of "5.2", which is too large, is corrected downward to a target value of "4.8" via rotation 110 in the counterclockwise direction.

Figure 20:
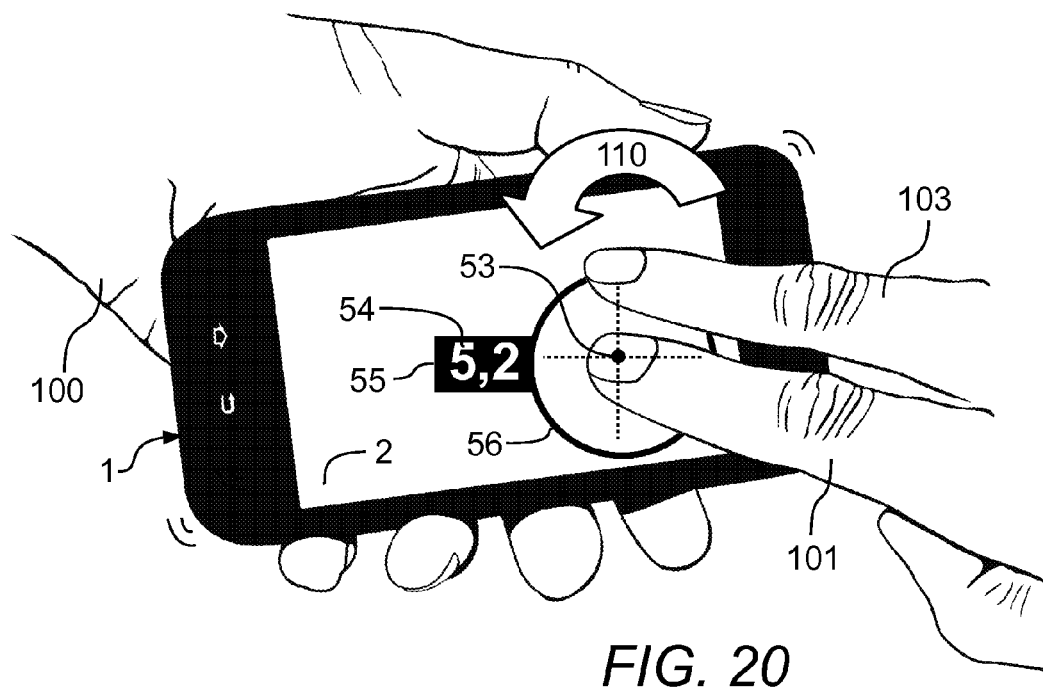
FIG. 20 shows the fine-tuning mode of the novel "turn-setting" gesture.

If the adjustable numeric value 54 or the graphical element needs to be configured with a particularly high degree of precision toward the end of the adjustment process, the user can now optionally touch the touchscreen 2 with a second finger or with more fingers to activate a fine-tuning mode. FIG. 20 shows by way of example as to how the touchscreen 2 is touched with the middle finger 103 in addition to the index finger 101.

Each additional finger or contact point on the touchscreen 2 may result in a reduction of the conversion ratio between the rotation of the smartphone 1 and the adjustable numeric value 54. That is, the greater the number of fingers touching the touchscreen 2, the less pronounced is the effect of rotation 110 of the smartphone 1 on the adjustable value 54, thus allowing for precise adjustments or fine-tuning. FIG. 20 shows by way of example as to how the user rotates the smartphone 1 in the counterclockwise direction 110 to correct the accidentally input, excessively high value of "5.2", downward in the fine-tuning mode. For this purpose, the fine-tuning mode may stay active so long as the touchscreen 2 is touched with two or more fingers 101, 103.

Depending on the embodiment, during fine-tuning, the pivot point 53 may remain under the index finger 101 or under the finger that has touched the touchscreen 2 first. Thus, the additional fingers 103 are sliding on the touchscreen 2 around the index finger 101 or the first finger.

Referring to FIG. 19, as soon as the adjustable numeric value 54 has reached the desired target value, the user stops rotating the smartphone 1 around the Z-axis at time point t5. Next, at time point t6, the user removes the index finger 101 and, if applicable, any further fingers 103 from the touchscreen 2. The "turn-setting" gesture is completed.

Otherwise, to cancel the current process of adjusting a value 54 or property, the user can finish the "turn-setting" gesture sequence by performing an alternative completion other than removing the finger 101 from the touchscreen 2 in a regular manner. For example, the novel "move-away" gesture or a flick movement can be used to cancel the current input at the end of the "turn-setting" gesture sequence. In this case, the previously configured numeric value 54 or property will remain.

While rotating the smartphone 1, human anatomy limits the motion range of the hand 100. Therefore, the "turn-setting" gesture procedure can be repeated in the same direction several times to modify a value over a greater range, similar to screwing and unscrewing a threaded part using a screwdriver: e.g., touch touchscreen 2, rotate smartphone 1, remove finger 101, touch touchscreen 2 again, rotate smartphone 1 again, remove finger 101 again, etc. Finally, the user may activate the fine-tuning mode on the last repetition of the "turn-setting" gesture to adjust the desired target value.

From the perspective of the control unit 12 pursuant to the embodiment shown in FIG. 3, the "turn-setting" gesture is recognized as follows:

The touchscreen 2 indicates the beginning of a contact at time point t1 by triggering the touchscreen event "contact begin" 27. The event "contact begin" 27 is passed on unfiltered as a gesture event 21. In case the location of the contact on the touchscreen 2 is relevant, that is, a control element that accepts the "turn-setting" gesture as an input is touched, the current value of the yaw angle 19 around the Z-axis is queried at time point t1. As described above, the yaw angle 19 may be calculated via combined motion analysis 10 of the values measured by the gyroscope 4 and/or magnetometer 5. The yaw angle 19 at time point t1 is stored temporarily as a reference value.

In further course of the procedure, the current value of yaw angle 19 around the Z-axis is checked continuously through repeated queries. At time point t3, as soon as the absolute difference between the current value of yaw angle 19 and the reference value increases beyond the threshold value for minimum rotation 25, the beginning of the "turn-setting" gesture is recognized. A corresponding gesture event "turn-setting begin" 58 is triggered by the control unit 12, and the rotation process is depicted graphically on the touchscreen 2. Furthermore, the current value of yaw angle 19 at time point t3 is stored as an initial value. This is done to compensate for the threshold value for minimum rotation 25 so that input is possible even with small changes in value.

The threshold value for minimum rotation 25 is defined as a positive value and can be determined empirically. Depending on the intended application, the threshold value should be selected such that it is higher than minor rotations caused unintentionally by the user while touching the touchscreen 2.

After time point t3, the control unit 12 may continuously trigger the gesture event "turn-setting delta" 59 whenever a change in yaw angle 19 is detected. E.g., this may be done to inform the application program ("app") about the rotation of the smartphone 1 around the Z-axis. The difference between the stored initial value and the current value of the yaw angle 19 is handed over as a parameter.

Optionally, in case there are no conflicts with other supported gestures at the specific location on the touchscreen 2, the "turn-setting" gesture and the corresponding graphical representation can already be activated upon the touchscreen event "contact begin" 27 at time point t1. In this case, the gesture event "turn-setting begin" 58 is triggered at time point t1 and the "turn-setting delta" events 59 are triggered continuously after time point t2. The threshold value for minimum rotation 25 and the associated calculation steps can be omitted.

Depending on the specific embodiment, the graphical representation of the rotation process on the touchscreen 2 can be executed by the operating system or by the application program ("app"). In the first scenario, the operating system handles the graphical representation and transmits the adjusted value 54 or property to the application program ("app"). In the second scenario, the application program ("app") must execute the graphical representation itself. For this purpose, the application program ("app") may receive information about user actions via "turn-setting begin" 58, "turn-setting delta" 59, and "turn-setting end" 60 events.

With reference to FIG. 19, for purpose of example only, graphical representation of the rotation process on the touchscreen 2 is achieved by displaying animated circle 56, which surrounds the contact point of the finger 101, and whose diameter visualizes the size of the value currently configured by the user. The tab 55 adjacent to the animated circle 56 contains a labeling field with the numeric value 54, which is adjusted by the user.

The numeric value 54 and the diameter of the animated circle 56 are calculated in relation to the difference between the stored initial value and the current value of the yaw angle 19 around the Z-axis. This relationship can be expressed, for instance, as a linear or logarithmic dependence. For example, in the case of a linear dependence, a signed difference of rotation angles is calculated from the stored initial value and the current value of yaw angle 19. Next, the difference of rotation angles is converted into a value from the range of values of the adjustable numeric value 54 for displaying it in the tab 55. Likewise, the difference of rotation angles is converted into a diameter of circle 56, restricting the range of values for the diameter such that the minimum diameter results in a small circle 56 surrounding the finger 101, and the maximum diameter is adapted to the size of the touchscreen 2.

Optionally, as soon as the touchscreen 2 reports additional contact points since the user touches the touchscreen 2 with two or more fingers 101, the control unit 12 switches to the fine-tuning mode. Precise adjustment of the numeric value 54 is ensured by a reduction of the conversion ratio between the difference of rotation angles and the adjustable numeric value 54. E.g., the greater the number of contact points reported by the touchscreen 2, the smaller is the change in value of the adjustable numeric value 54.

To ensure that the resizing of the animated circle 56 is clearly visible for prolonged rotations of the smartphone 1 in the same direction, it can be animated in a cyclic manner. For example, the user rotates the smartphone 1 in the clockwise direction to increase the adjustable numeric value 54; as soon as the animated circle 56 reaches its maximum diameter, it is faded out softly and then made to reappear as an animated circle 56 with the minimum diameter. If the user continues to rotate the smartphone 1 in the same direction, the reappeared animated circle 56 continues to grow until it reaches its maximum diameter again. Additionally, it is possible to display and animate a combination of several, concentric circles 56 staggered in time.

In the opposite case of rotation in counterclockwise direction 110, as shown in FIG. 20, for purpose of example only, the adjustable numeric value 54 is decreased and the diameter of the animated circle 56 is reduced. If the user continues to rotate the smartphone 1 in the counterclockwise direction, the animated circle 56 reaches its minimum diameter, whereupon it reappears as an animated circle 56 with the maximum diameter.

Optionally, the tab 55 adjacent to the animated circle 56 is rotated around the pivot point 53, i.e. the center of the animated circle 56, so that the user is able to read the adjustable numeric value 54 shown on the tab 55 horizontally aligned throughout the rotation process. For example, with reference to FIG. 19, the tab 55 and the displayed numbers "1.7" and "5.2" remain horizontally aligned at all times, even though the user rotates the smartphone 1 by more than 40°.

To ensure that the tab 55 and the adjustable numeric value 54 are aligned horizontally at all times, the tab 55 and the adjustable numeric value 54 are rotated by an angle opposite to the angle by which the user rotates the smartphone 1, so that the two rotation angles offset each other.

As soon as the touchscreen 2 issues the event "contact end" 28 at time point t6, thus indicating that the user has removed all fingers 101 from the touchscreen 2, the control unit 12 triggers the gesture event "turn-setting end" 60. The adjusted numeric value 54 or property and/or the difference between the stored initial value and the final value of yaw angle 19 at time point t6 are handed over to the application program ("app") as a parameter. The animated circle 56 and the tab 55 containing the adjusted numeric value 54 are hidden. The gesture "turn-setting" is completed and no further "turn-setting delta" events 59 are triggered by the control unit 12.

Figure 21:
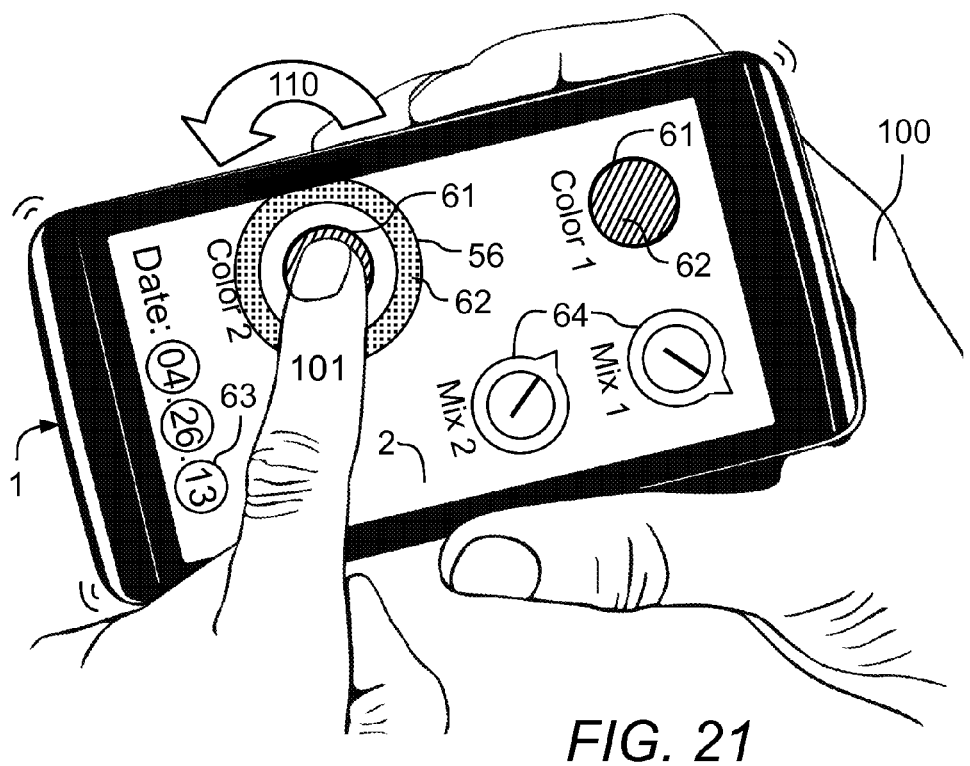
FIG. 21 shows visual representations and applications of the novel "turn-setting" gesture.

FIG. 21 shows different exemplary layouts and application scenarios. The touchscreen 2 contains five independent control elements that support the gesture "turn-setting", namely two color-selection circles 61, two control dials 64, and a date setting 63.

The first color-selection circle 61 on the right-hand side of FIG. 21 is labeled "Color 1", and it shows a configured hue or color 62 in the interior. The user can change the configured hue or color 62 by touching the color-selection circle 61 with a finger 101 and then performing the "turn-setting" gesture by rotating the smartphone 1. This process is demonstrated for the second color-selection circle 61 labeled "Color 2", which is located on the left-hand side of FIG. 21. The rotation 110 of the smartphone 1 changes the hue or color 62 of the animated circle 56 and optionally the diameter of the animated circle 56. As soon as the user is satisfied with the adjusted hue or color 62, the user can remove the finger 101 from the touchscreen 2, and the new hue or color 62 will be adopted by the interior of the color-selection circle 61. Otherwise, the user can cancel the current color selection process by performing a different gesture completion instead of removing the finger 101, for example, the novel "move-away" gesture or a flick movement. In this case the previous hue or color 62 will remain in the interior of the color-selection circle 61.

Furthermore, FIG. 21 shows two control dials 64 labeled "Mix 1" and "Mix 2", whose hands point in different directions. The control dials 64 are control elements that allow the user to configure quasi-analog values by touching the control dial 64 with a finger 101 and by performing the "turn-setting" gesture. The numerous potential applications include, inter alia, volume control, the adjustment of screen brightness, and the configuration of mixing ratios.

Finally, FIG. 21 shows a control element for date setting 63. The numbers of the date (format: month, day, year) are surrounded by a circle to illustrate to the user that it is possible to change these values and to distinguish the date setting 63 from conventional text. As soon as the user touches a number, e.g. "26", for the day, the user is able to set a new day by executing the "turn-setting" gesture. The same applies for the month "04" and the year "13".

Figure 22:
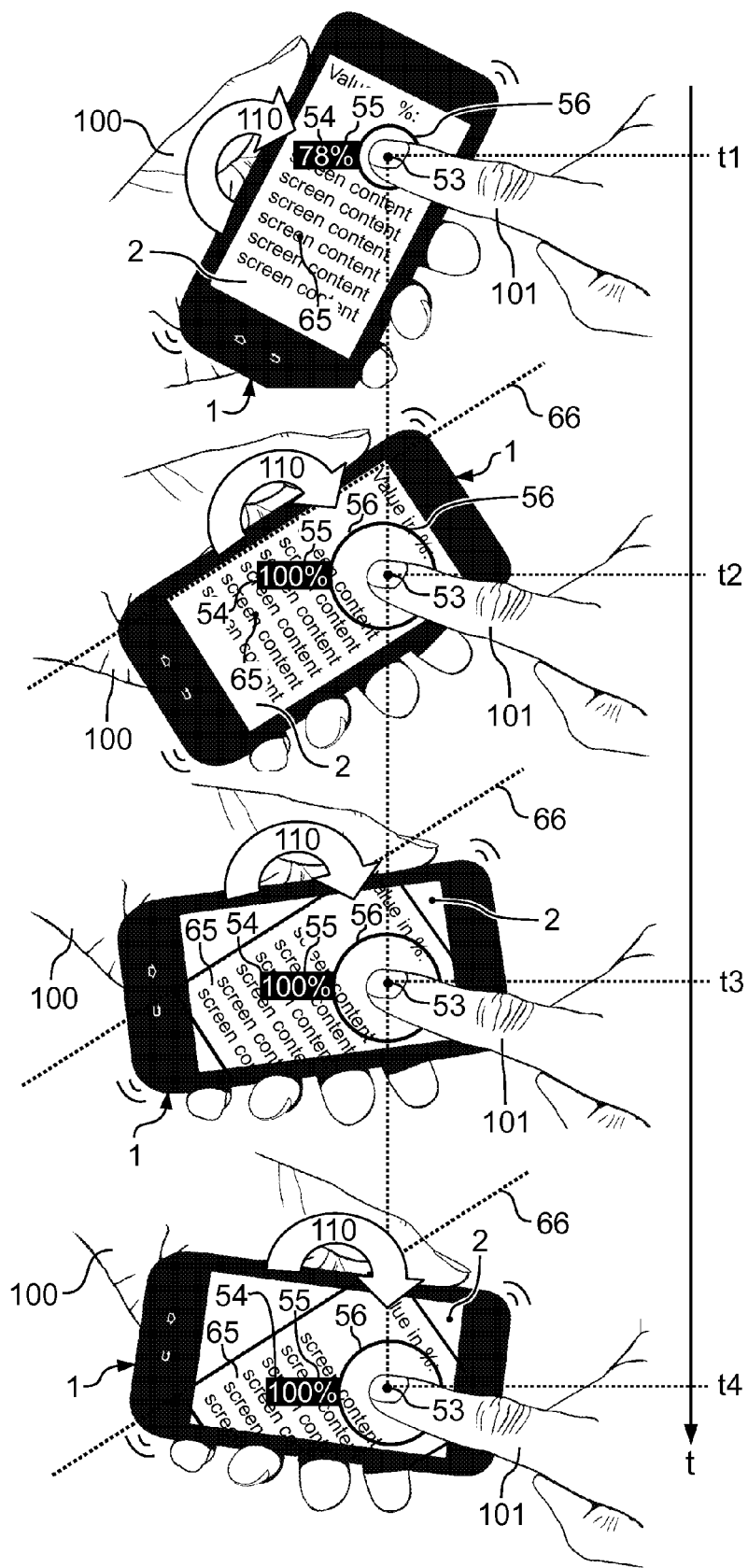
FIG. 22 shows an overwind protection for the novel "turn-setting" gesture.

In one possible embodiment, the novel gesture "turn-setting" features an overwind protection. This is illustrated in FIG. 22 by way of example: A percentage number is set as an adjustable numeric value 54 that can be varied between "0%" and "100%". The percentage number is displayed on the tab 55, e.g. "78%" at time point t1.

As per FIG. 22, the smartphone 1 is rotated 110 in clockwise direction by the user, which eventually leads to the highest possible value "100%" being reached at time point t2. At this time, a limit stop takes effect. After time point t2, to visualize the limit stop, the entire displayed screen content 65 is rotated on the touchscreen 2 in the counterclockwise direction such that the original spatial alignment of the screen content 65, shown with dotted line 66 in FIG. 22, remains unchanged, while the user continues to rotate the smartphone 1 in the clockwise direction.

For example, at time point t3, FIG. 22 shows as to how the displayed screen content 65 has been rotated to retain the original spatial alignment 66 of the screen content 65, despite continued rotation 110 of the smartphone 1 around the Z-axis. The screen content 65 may be rotated around the pivot point 53, i.e. the contact point of the finger 101 on the touchscreen 2. In addition, the animated circle 56 around the pivot point 53 is no longer enlarged after time point 2, even if the user continues to rotate the smartphone 1 in the clockwise direction.

To ensure that the screen content 65 retains its spatial alignment 66 as soon as the limit stop has taken effect, the screen content 65 is always rotated by an angle opposite to the angle by which the user rotates the smartphone 1. Thus, the two rotation angles offset each other.

The overwind protection indicates to the user in a clear and intuitive manner that he/she has reached the end of the adjustable range of the numeric value 54 or property because the screen content 65 starts to rotate as well. Also, because of the rotation of the entire screen content 65, parts of the screen content 65 may disappear from the touchscreen 2 temporarily, e.g., at the edges.

Referring to the example in FIG. 22, the illustration at time point t4 shows as to how the original spatial alignment 66 of the screen content 65 is retained when the user continues to rotate 110 the smartphone 1 in the clockwise direction despite reaching the limit stop.

As soon as the user removes the finger 101 from the touchscreen 2, e.g., at time point t4, the entire screen content 65 may rotate back to its initial position, i.e., it reverts to the normal display corresponding to time point t2. The rotation of the screen content 65 back to the initial position is preferably implemented as a soft and smooth animation so that the user associates the process with a subdued torsion spring system. Accordingly, the physical characteristics of a subdued torsion spring system can be used as the mathematical basis for the animation. At the latest, when the screen content 65 is back in its initial position, the "turn-setting" gesture is completed. The upper or lower range limit of the adjustable range is input as the final adjusted value 54 or property depending on whether the upper or lower limit stop has taken effect. In the example pursuant to FIG. 22, the upper limit stop takes effect and, accordingly, the final adjusted value 54 is "100%".

Alternatively, with reference to FIG. 22, instead of lifting the finger 101 from the touchscreen 2 at time point t4 (or any other time point after t2), the user can rotate the smartphone 1 back until the screen content 65 is restored to its initial position. In the example shown in FIG. 22, this involves rotating the smartphone 1 in the counterclockwise direction, while the screen content 65 rotates back to its initial position in the clockwise direction. After exiting the limit stop, it is again possible to adjust the adjustable numeric value 54 or property within the adjustment range, e.g., between "0%" and "100%". Obviously, if the finger 101 is now removed from the touchscreen 2, no animated rotation of the screen content 65 is required since the screen content 65 is already in its initial position.

The novel gestures "move-away", "pull up", "inverse tap", "drag-along", "drag-away", "forearm-spin", and "turn-setting", as well as other variants, are not limited to the examples illustrated in the drawings and are not limited to the embodiment pursuant to FIG. 3. In a divergence from the presented examples, it is also possible to use another finger, a thumb, or the other hand for performing the novel gestures. Similarly, instead of the finger 101, it is possible to use a stylus, e.g., a capacitive stylus 111 or another input object. The novel gestures can also be executed while wearing gloves, i.e., with a small gap between the finger 101 and the touchscreen 2, provided that the touchscreen 2 supports such a gap, for example, by means of a capacitive proximity sensor.

In addition, the novel gestures and possible variants, as well as conventional gestures, can be combined to create further novel gestures by executing the procedures of two or more gestures one after the other or simultaneously. For example, a novel "inverse double tap" gesture can be introduced by executing the "inverse tap" gesture twice in a quick succession, analogous to the classic double click.

The illustrations and the descriptions of the novel gestures consider the common scenario, wherein the touchscreen 2 is held horizontally or at a slight angle and the user looks at the touchscreen 2 from above. However, all novel gestures, and all further variants, can be executed and recognized in any other body position with its relevant spatial orientation, e.g. in cases where the user lies on the back and, consequently, the touchscreen 2 is pointed downwards, or in cases where the user lies on the side, or if the user is in a weightless environment. The description on how to perform the novel gesture should be adapted correspondingly in such cases in line with the different spatial orientations. Regarding the control unit 12, there is no difference in principle with respect to the recognition of the novel gestures because the gravity component is eliminated.

In a possible embodiment, one or more novel gestures are accepted at any location on the entire touchscreen 2, regardless of any existing buttons, icons, and control elements for conventional gestures. This variant is suitable, inter alia, for a global user control concerning system functions of the operating system, which are not associated with specific content displayed on the touchscreen 2, such as for a global volume control, a global "Back" function, a "Search" function, or a "Home" function for returning to the home screen. Because the novel gestures can be used together with conventional gestures and since the control unit 12 can distinguish between such gestures, it is possible to completely dispose of separate buttons or separate sensor keys for functions such as "Back", "Search", and "Home". E.g., by omitting separate hardware buttons of a smartphone 1, the smartphone 1 can be made smaller or the touchscreen 2 can be made larger.

Some embodiments of smartphones 1 use onscreen soft keys for functions such as "Back", "Search", and "Home." Typically, these soft keys are touchscreen keys at the bottom of the touchscreen 2, and they replace hardware buttons such as the "Home" button. Usually, these soft keys are displayed permanently on the touchscreen 2, so they effectively reduce the usable size of the touchscreen 2. In one possible embodiment, a configuration menu allows the user to select a preference between using the soft keys or the novel gestures for functions such as "Back", "Search", and "Home". If the user selects the novel gestures, the soft keys are removed from the lower part of the touchscreen 2, and additional space is gained on the touchscreen 2.

Furthermore, the novel gestures can be performed using several fingers 101, 103 simultaneously, more specifically, by moving the smartphone 1 below several unmoved fingers. As soon as the touchscreen 2 comes in contact with the fingers 101, 103, the number of contact points is recognized in connection with touchscreen events such as "contact begin" 27, "drag" 41, and "flick" 43. This is known as multi-touch. Depending on the number of recognized contact points, different gesture events 21 can be triggered by the control unit 12, and hence different functions or tasks, e.g., of an application program ("app"), can be executed.

For example, the "inverse tap" gesture can be implemented such that the first item from a collapsed dropdown list is selected in case the gesture is executed with one finger. The second item is selected when executed with two fingers, the third when executed with three fingers, and so on.

Another example involves a web browser that recognizes the "move-away" gesture anywhere on a web page. In case the "move-away" gesture is executed with one finger, the browser navigates back to the previous web page, which works analogously to the well-known "Back" button. If the user executes the "move-away" gesture with two fingers instead, the browser navigates back to the penultimate web page from the browser history, and so on.

Figure 23:
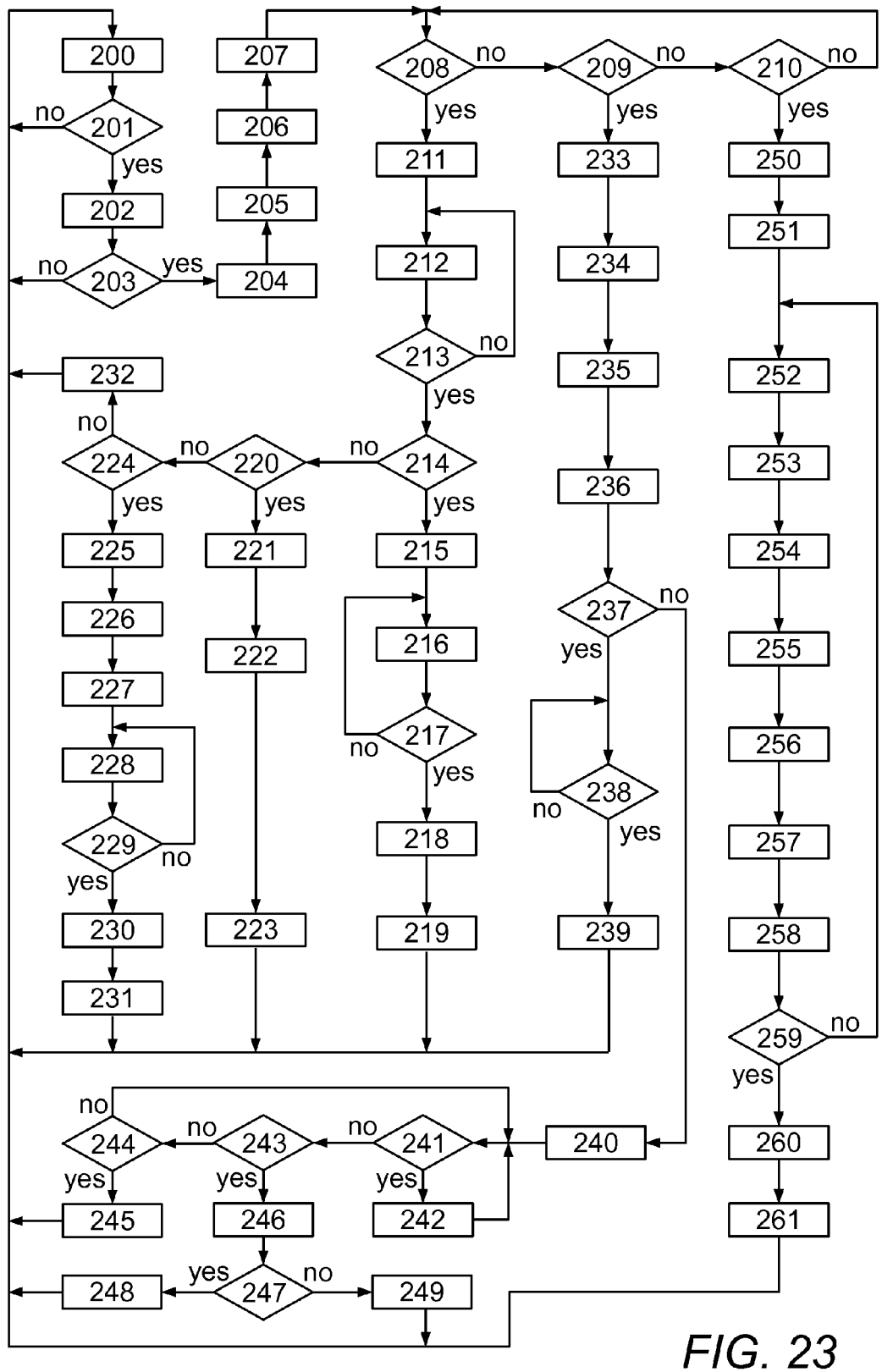
FIG. 23 is a flowchart of a further embodiment supporting several novel gestures at the same time.

FIG. 23 shows a flowchart of a further embodiment. The flowchart illustrates the operation of the novel gestures "move-away", "pull up", "inverse tap", "drag-along", "drag-away", and "turn-setting", which are accepted concurrently with conventional gestures even in the same region on the touchscreen 2. This specific region can be a control element, section of the touchscreen 2, or the entire touchscreen 2.

The list of reference numerals describes the steps of the flowchart in detail. The meaning of the constants, variables, vectors, and functions in the flowchart is defined as follows:

The function "Acceleration(t)" provides access to a memory area containing the acceleration values 16 (compensated for gravity). The function "Velocity(t)" provides access to a memory area containing the velocity values 17. The function "Position(t)" provides access to a memory area containing the values of the position shift 18. The function "GetTime( )" represents a system function that provides the time of a timer 15 with a sufficiently high resolution. The function "GetYaw( )" represents a system function that provides the yaw angle 19 around the Z-axis, as determined by combined motion analysis 10. The sub-system "Integrator" 13, 14 calculates the velocity or position shift. The constant "delta_t" is the time offset 31. The constants "threshold_min_acceleration", "threshold_negligible_velocity", "threshold_min_velocity", and "threshold_min_rotation" are the respective threshold values of acceleration, velocity, and rotation. The function "Abs( )" provides the absolute value of a scalar. The function "Magnitude( )" calculates the magnitude of a vector. The function "Antiparallel( )" checks whether two vectors point approximately in opposite directions and responds with "true" if this is the case, otherwise with "false". The variables "distance", "distance1", and "distance2" are the measured distances of the gestures and are handed over as a parameter. The vector "delta_vector" is the delta vector 49 reported by the touchscreen events "drag" 41 and/or "drag delta" 42. The vector "flick_direction" specifies the flick direction 52 reported by the touchscreen event "flick" 43. The variables "reference_value", "initial_value", and "rotation angle" are used to store yaw angles. The variable "setting_value" is the adjustable numeric value 54 of the gesture "turn-setting". The function "GetTouchscreenContactPointCount( )" represents a system function that provides the number of concurrent contact points on the touchscreen 2. The function "RangeConversion( )" reduces the conversion ratio between the yaw angle 19 and the adjustable numeric value 54 depending on a factor. The variable "factor" controls the reduction of the conversion ratio.

With reference to the flowchart shown in FIG. 23, recognition and differentiation of the novel gestures, as well as the conventional gestures "contact begin" 27, "contact end" 28, "drag" 41, and "flick" 43, works as follows:

After a "contact begin" 27 event that is considered relevant (see steps 201 and 203), the acceleration curve 16 is processed (see steps 206 and 207). Next, depending on whether a touchscreen event "contact end" 28 (see step 208), touchscreen event "drag" 41 (see step 209), or rotation around the Z-axis (see step 210) is involved, the flowchart branches to a subregion in charge of the recognition of a particular gesture type.

In case the event "contact end" 28 occurs (see branch 208), it is checked against the corresponding criteria (see step 214, 220 and 224), whether the gesture "move-away", "pull up", or "inverse tap" is present. If yes, a corresponding gesture event 21 is output (see steps 219, 223, and 227). Otherwise, the conventional event "contact end" 28 is output as gesture event 21 (see step 232).

In case the event "drag" 41 occurs (see branch 209), it is checked against the corresponding criteria (see step 237 and 247), whether the gesture "drag-along" or "drag-away" is present. Depending on the result a corresponding gesture event 21 is output (see steps 239, 240 and 248).

In the case of rotation around the Z-axis (see branch 210), the gesture event "turn-setting begin" 58 is output (see step 250), and the gesture is processed in a loop. The gesture event "turn-setting delta" 59 is output periodically, and the animated circle 56 as well as the tab 55 with the adjustable value 54 are displayed on the touchscreen 2 (see steps 252, 254, 255 and 258). The contact point number on the touchscreen 2 is provided by the function "GetTouchscreenContactPointCount( )". The reciprocal value of this contact point number is used as a factor for fine adjustment whenever the touchscreen 2 is touched with more than one finger 101 (see steps 256 and 257).

After the touchscreen event "contact end" 28, the flowchart exits the loop (see step 259). The gesture event "turn-setting end" 60 is output and the final numeric value 54 is displayed on the touchscreen 2 (see steps 260 and 261).

Further optimizations are possible. The novel gestures can be divided into gestures that require continuous caching of acceleration values 16 in the buffer 11, namely, "pull up", "inverse tap", and "drag-along", and gestures that do not require such caching, namely, "move-away", "drag-away", "forearm-spin", and "turn-setting". To save energy and/or CPU time, buffering of the acceleration values 16 can be disabled so long as the gestures "pull up", "inverse tap", and "drag-along" are not required for the current content or not supported by the current content on the touchscreen 2. The remaining gestures do not require information about the acceleration curve 16 before the touchscreen event "contact begin" 27. As soon as new content on the touchscreen 2 requires or supports at least one of the gestures "pull up", "inverse tap", or "drag-along", buffering may be reactivated.

Figure 24:
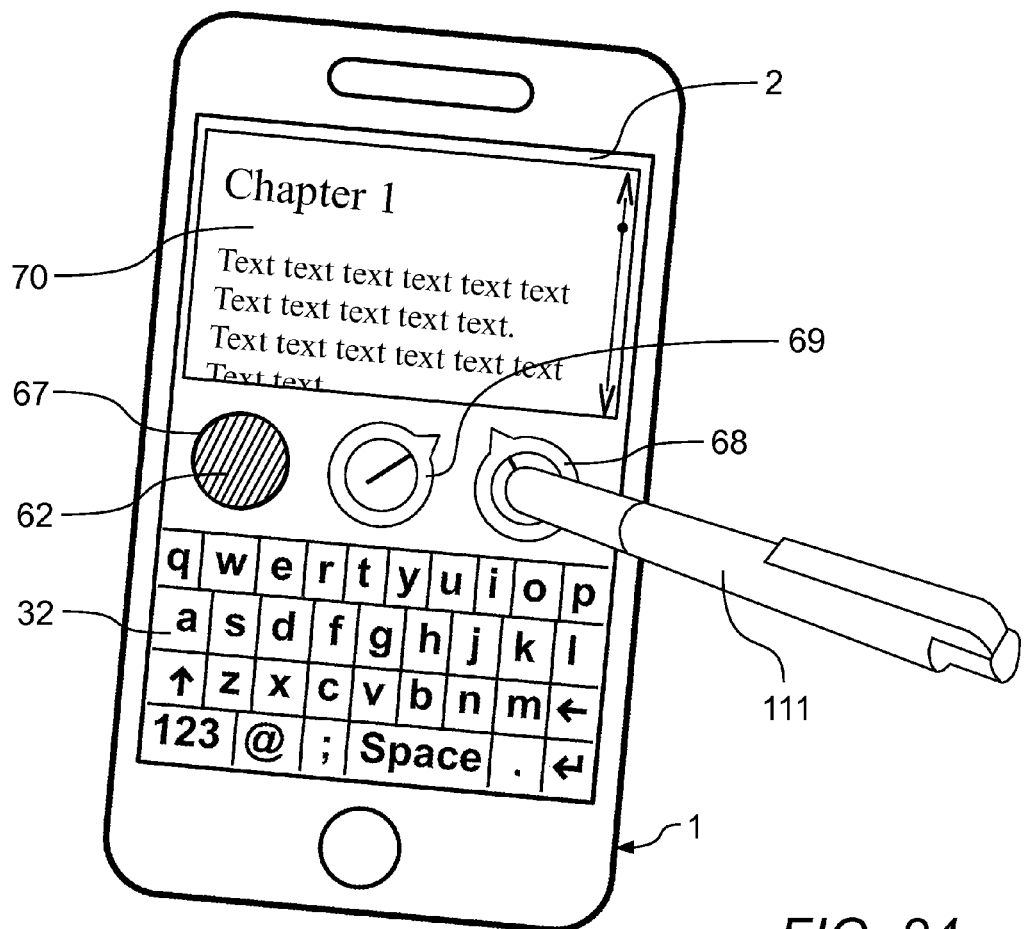
FIG. 24 shows a constellation of control elements in which buffering is not required.

FIG. 24 shows an example of content on the touchscreen 2 that does not require buffering of acceleration values 16. The content displayed on the touchscreen 2 includes an on-screen keyboard 32 that allows the user to input uppercase letters by executing the "move-away" gesture. That is, as per FIG. 5, the on-screen keyboard 32 recognizes the gesture "move-away" as input. Unlike other embodiments, this is done without checking the criteria at time point t1 (pursuant to FIG. 4) because there is no demand for distinguishing the gesture from the "pull up" and "inverse tap" gestures, which are not used in the present example. Thus, checking the criteria at time point t4 (pursuant to FIG. 4) is sufficient.

With continued reference to FIG. 24, the content displayed on the touchscreen 2 also comprises a color-selection circle 67 that allows the user to set a font color 62 by executing the "turn-setting" gesture. Furthermore, the content displayed on the touchscreen 2 encompasses two control dials 68, 69 to set the font size and font type by executing the "turn-setting" gesture.

Moreover, the touchscreen 2 as per FIG. 24 shows a novel type of text box 70 that accepts the "drag-away" gesture. The user may scroll through the text using a regular drag gesture. Whereas, as soon as the gesture "drag-away" is recognized by the text box 70, the text is jumped to the next chapter, for example from "Chapter 1" to "Chapter 2", or to the next paragraph, or to the end of the text.

In addition, FIG. 24 shows that instead of a finger 101, the novel gestures can be operated with a stylus 111 or any other input object.

Further embodiments are possible. For example, if the novel gestures are restricted to "move-away", "pull up", and "inverse tap", the gyroscope 4, magnetometer 5, buffer 11, and the two integrators 13, 14 as per FIG. 3 can be omitted. In such a case, the three novel gestures may be detected solely based on a smoothed acceleration curve 16.

Figure 25:
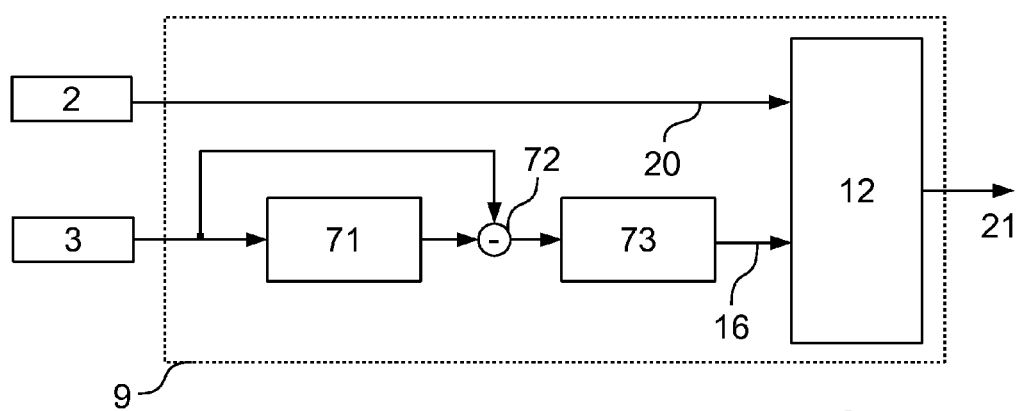
FIG. 25 shows the block diagram of a minimalistic embodiment.

The block diagram in FIG. 25 shows such an embodiment. The gravity component is extracted from the acceleration measured by the accelerometer 3 using a low-pass filter 71. Next, the gravity component is subtracted from the current acceleration via vector calculation to obtain an approximate value of pure acceleration 16. A subsequent high-pass filter 73 improves the outcome.

With continued reference to FIG. 25, the task of the control unit 12 is to recognize the three novel gestures "move-away", "pull up", and "inverse tap" and to distinguish them from conventional gestures. For this purpose, the control unit 12 analyzes the pure acceleration 16 upon the occurrence of the touchscreen events "contact begin" 27 and "contact end" 28. In accordance with the coordinate system 6 defined in FIG. 1, if a significant negative acceleration is measured in the direction of the Z-axis, as the smartphone 1 comes in contact with the finger 101 and/or loses contact with the finger 101, one of the three novel gestures is present.

More specifically, the control unit 12 proceeds as follows: First, upon the occurrence of the touchscreen event "contact begin" 27 the control unit 12 forwards this event as a gesture event 21. Next, if the acceleration is low during the event "contact begin" 27 and if the acceleration points in the negative Z-direction during the subsequent event "contact end" 28, the control unit 12 triggers the gesture event "move-away recognized" 29. If the acceleration points in the negative Z-direction during the event "contact begin" 27 and if the acceleration is low during the subsequent event "contact end" 28, the control unit 12 triggers the gesture event "pull up recognized" 36. If the acceleration points in the negative Z-direction during the event "contact begin" 27 and if the acceleration also points in the negative Z-direction during the subsequent event "contact end" 28, the control unit 12 triggers the gesture event "inverse tap recognized" 39. If none of these conditions applies, the control unit 12 forwards the conventional touchscreen event "contact end" 28 as a gesture event 21.

Different features can be used for recognizing the novel gestures. Specifically, these features are not limited to the course of the velocity 17, as implemented in the first embodiment pursuant to FIG. 3. Instead, by way of example, the acceleration curve 16 and/or position shift 18 can be evaluated. For instance, the acceleration curve 16 can be evaluated directly by examining specific characteristics of the curve 16, such as significant minima and maxima within a defined timeframe. Moreover, it is possible to combine evaluation of the acceleration 16, velocity 17, and/or position shift 18, and the curves can be examined with various analysis methods such as averaging calculations or statistical methods.

In this context it should be expressly noted that it is also possible to evaluate the sensor data without checking against strict threshold values at predefined points in time. However, if threshold values are used as a criterion or as an integral part of the analysis method, these values can be defined individually for each case and/or gesture. For example, the threshold values can vary depending on the direction of the acceleration 16, velocity 17, and/or position shift 18. If the analysis method tests certain properties at predefined time points, these time points can be defined individually for each case and/or gesture. For example, different values can be selected for the time offset "delta t" 31 pursuant to FIG. 4, FIG. 6, and FIG. 9, depending on whether "delta t" 31 is used for determining time point t1 or time point t4.

Moreover, the threshold values, time points, and/or other properties can be configured according to the input characteristics of the user. For example, the control unit 12 can have learning capability and be able to adapt to the motion pattern and input speed of an individual user. The system can learn from incorrect input or false conclusions. Additionally, the control unit 12 can adapt to compromised acceleration values, which can occur when the user is riding on a bus, train, or some other form of transportation. These adjustments can also be made in consideration of a specific time of the day or day of the week.

The exemplary embodiments pursuant to FIG. 3 and FIG. 23 demonstrate the use of a three-axis acceleration sensor 3, a three-axis gyroscope 4, and a three-axis magnetometer 5. However, it is possible to use acceleration sensors, gyroscopes, and magnetometers that support fewer axes only. E.g., for the novel gestures "move-away", "pull up", and "inverse tap", it is sufficient to implement a single-axis acceleration sensor that measures accelerations along only the Z-axis. Similarly, a double-axis acceleration sensor is sufficient for capturing the acceleration in the X-Y plane corresponding to the novel gestures "drag-along" and "drag-away." For the novel gestures "forearm-spin" and "turn-setting", a single-axis gyroscope is sufficient to measure the rotation around the X-axis or Z-axis, respectively.

Furthermore, in the exemplary embodiments pursuant to FIG. 3, FIG. 23, and FIG. 25, the novel gestures are integrated in an operating system, which typically means that the application programs ("apps") are notified via the gesture event 21 each time a novel gesture is recognized by the corresponding subsystem of the operating system, e.g., the control unit 12. However, it is equally possible to implement native support for the novel gestures in any application program ("app"), irrespective of the operating system. The novel gestures are then available to the user as soon as an application program ("app") that supports the novel gestures is executed on any conventional operating system. Such an implementation corresponds to the embodiments shown in FIG. 3, FIG. 23, and FIG. 25, with the difference that the control unit 12 and the entire software implementation 9 are now components of the application program ("app"). Hence, the gesture events 21 issued by the control unit 12 represent internal signals within the application program ("app"), which trigger further functions of the application program ("app").

In FIG. 1 to FIG. 25 and in the corresponding descriptions, the novel gestures are described using a smartphone 1 and a smartwatch 26. Yet, any other portable, electronic device can be used, such as a mobile phone, tablet computer, TV remote control, portable keyboard, or wearable computer (also known as body-borne computers or wearables, e.g., a touchscreen device or touch-sensitive surface integrated into clothing).

Although the description above contains many specificities, these should not be construed as limiting the scope of the embodiments but as merely providing illustrations of some of several embodiments. Thus the scope of the embodiments should be determined by the appended claims and their legal equivalents, rather than by the examples given.

In the claims the terms "gesture sequence" and "gesture parts" are used. The novel gestures "move-away", "pull up", "inverse tap", "drag-along", "drag-away", "forearm-spin", and "turn-setting" are examples of gesture sequences and the respective steps to perform these gestures (e.g., first step: moving the finger, second step: moving the device) are examples for gesture parts. It is expressly noted that the term "gesture" in the present disclosure has the same meaning as "gesture sequence", i.e., a gesture may be defined as a gesture sequence consisting of at least one gesture part.

The conjunction "or", as used in the claims, shall be interpreted as an alternative between two (or more) features, such as alternative method steps, and shall not be construed to specifically exclude any "non-selected" feature (such as an "XOR" operator). A list of features connected with an "or" that starts with the phrase "at least" or that ends with the phrase "a combination thereof" covers both single features from the list as well as any groups of features thereof. Furthermore, the conjunction "or", as used in the claims, shall not be construed as a logical "OR" operator of a computer program: Even if a claim contains a condition, the conjunction "or" is intended to specify alternative features of the claim such as alternative method steps.

Finally, it is expressly noted that the term "at least one input object" may represent, inter alia, a single finger, two fingers, three fingers, etc., and the term "at least one finger" may also represent one or more input objects.

LIST OF REFERENCE NUMERALS

1 Smartphone
2 Touchscreen
3 Accelerometer (three-axis)
4 Gyroscope (three-axis)
5 Magnetometer (three-axis)
6 Definition of coordinate system
7 Distance traveled between time points t3 and t5
8 Distance traveled between time points t0 and t2
9 Hardware circuit or software implementation
10 Combined motion analysis
11 Buffer for acceleration values
12 Control unit
13 Integrator: Velocity calculation
14 Integrator: Position shift calculation
15 Timer
16 Acceleration compensated for gravity (X, Y, Z components)
17 Velocity (X, Y, Z components)
18 Position shift (X, Y, Z components)
19 Yaw angle (Z-axis)
20 Touchscreen event (input)
21 Gesture event (output)
22 threshold value for negligible velocity
23 threshold value for minimum velocity
24 threshold value for minimum acceleration
25 threshold value for minimum rotation
26 Smartwatch
27 Touchscreen event: "contact begin"
28 Touchscreen event: "contact end"
29 Gesture event: "move-away recognized"
30 Gesture event: "distance of move-away"
31 Time offset "delta t"
32 Onscreen keyboard supporting "move-away" gesture
33 Cursor
34 Lowercase letter "d"
35 Uppercase letter "D"
36 Gesture event: "pull up recognized" with distance parameter
37 Map: zoomed-out
38 Map: zoomed-in
39 Gesture event: "inverse tap recognized"
40 Gesture event: "distance of inverse tap"
41 Touchscreen event: "drag"
42 Touchscreen event: "drag delta"
43 Touchscreen event: "flick"
44 Gesture event: "drag-along recognized"
45 Touchscreen event: "drag completed"
46 Gesture event: "forearm-spin recognized"
47 Gesture event: "drag-away recognized"
48 Drag movement with start and end points
49 Delta vector reported by "drag" or "drag delta"
50 Roll angle (X-axis)
51 Drag movement across touchscreen
52 Direction reported by "flick" event
53 Pivot point
54 Adjustable numeric value
55 Tab with labeling field
56 Animated circle
57 Axis of rotation
58 Gesture event: "turn-setting begin"
59 Gesture event: "turn-setting delta"
60 Gesture event: "turn-setting end"
61 Color-selection circle
62 Adjustable hue or color
63 Date setting
64 Control dial
656 Entire screen content
66 Orientation of screen content
67 Color-selection circle for font color
68 Control dial for font size
69 Control dial for font type
70 Scrollable text box
71 Low-pass filter
72 Vector subtraction
73 High-pass filter
100 Hand that holds smartphone
101 Index finger or any other finger
102 Forearm
103 Middle finger
104 Movement of finger along Z-axis
105 Movement of device in positive Z-direction
106 Movement of device in negative Z-direction
107 Forearm twist around X-axis
108 Movement of finger in X-Y plane
109 Movement of device in X-Y plane
110 Rotation of device around Z-axis
111 Stylus
200 Buffer acceleration values in array "Acceleration(t)";
201 Touchscreen event "contact begin" ?
202 Trigger gesture event "contact begin";
203 Location of the contact on touchscreen relevant ?
204 t2=GetTime( ); t1=t2−delta_t;
205 reference_value=GetYaw( );
206 Integrator: Calculate "Velocity(t)" from "Acceleration(t)" for the entire buffer;
207 Calibration: Velocity(t2).xyz=(0,0,0);
208 Touchscreen event "contact end" ?
209 Touchscreen event "drag" ?
210 Abs(GetYaw( )−reference_value)>threshold_min_rotation ?
211 t3=GetTime( ); t4=t3+delta_t;
212 t=GetTime( ); Integrator: Calculate "Velocity(t)" from "Acceleration(t)";
213 GetTime( )>=t4 ?
214 (Magnitude(Velocity(t1).xyz)<threshold_negligible_velocity) and (−Velocity(t4).z>threshold_min_velocity) and (Magnitude(Velocity(t4).xy)<threshold_negligible_velocity) ?

215 Trigger gesture event "move-away recognized";
216 t=GetTime( ); Integrator: Calculate "Velocity(t)" from "Acceleration(t)";
217 Magnitude(Velocity(t).xyz)<threshold_negligible_velocity ?
218 t5=GetTime( ); Integrator: Calculate "Position(t)" from "Velocity(t)" for interval [t3, t5];
219 Trigger gesture event "distance of move-away"; distance=Position(t3)−Position(t5);
220 (Velocity(t1).z>threshold_min_velocity) and (Magnitude(Velocity(t1).xy)<threshold_negligible_velocity) and (Magnitude(Velocity(t4).xyz)<threshold_negligible_velocity) ?
221 Determine t0 by scanning "Velocity(t)" backwards using the condition: Magnitude(Velocity(t0).xyz)<threshold_negligible_velocity;
222 Integrator: Calculate "Position(t)" from "Velocity(t)" for interval [t0, t2];
223 Trigger gesture event "pull up recognized"; distance=Position(t2)−Position(t0);
224 (Velocity(t1).z>threshold_min_velocity) and (Magnitude(Velocity(t1).xy)<threshold_negligible_velocity) and (−Velocity(t4).z>threshold_min_velocity) and (Magnitude(Velocity(t4).xy)<threshold_negligible_velocity) ?
225 Determine t0 by scanning "Velocity(t)" backwards using the condition: Magnitude(Velocity(t0).xyz)<threshold_negligible_velocity;
226 Integrator: Calculate "Position(t)" from "Velocity(t)" for interval [t0, t2];
227 Trigger gesture event "inverse tap recognized"; distance1=Position(t2)−Position(t0);
228 t=GetTime( ); Integrator: Calculate "Velocity(t)" from "Acceleration(t)";
229 Magnitude(Velocity(t).xyz)<threshold_negligible_velocity ?
230 t5=GetTime( ); Integrator: Calculate "Position(t)" from "Velocity(t)" for interval [t3, t5];
231 Trigger gesture event "distance of inverse tap"; distance2=Position(t3)−Position(t5);
232 Trigger gesture event "contact end";
233 t2=GetTime( );
234 Smooth "Acceleration(t)"; reduce noise;
235 Determine t0 by scanning "Acceleration(t)" backwards until a maximum is found. Condition: Magnitude(Acceleration(t0).xyz)>threshold_min_acceleration;
236 Integrator: Calculate "Velocity(t)" from "Acceleration(t)" for interval [t0, t2];
237 (Magnitude(Velocity(t2).xyz)>threshold_min_velocity) and (Abs(Velocity(t2).z)<threshold_negligible_velocity) and Antiparallel(Velocity(t2).xy, delta_vektor.xy) ?
238 Touchscreen event "flick" or "drag completed" ?
239 Trigger gesture event "drag-along recognized";
240 Trigger gesture event "drag";
241 Touchscreen event "drag delta" ?
242 Trigger gesture event "drag delta";
243 Touchscreen event "flick" ?
244 Touchscreen event "drag completed" ?
245 Trigger gesture event "drag completed";
246 t4=GetTime( ); Integrator: Calculate "Velocity(t)" from "Acceleration(t)" for interval [t2, t4];
247 (Magnitude(Velocity(t4).xyz)>threshold_min_velocity) and (Abs(Velocity(t4).z)<threshold_negligible_velocity) and Antiparallel(Velocity(t4).xy, flick_direction.xy) ?
248 Trigger gesture event "drag-away recognized";
249 Trigger gesture event "flick";
250 Trigger gesture event "turn-setting begin";
251 initial_value=GetYaw( );
252 Trigger gesture event "turn-setting delta"; rotation_angle=GetYaw( )−initial_value;
253 Convert "rotation_angle" into diameter of animated circle;
254 Display animated circle on touchscreen;
255 Rotate tab adjacent to animated circle by the negative value of "rotation_angle";
256 factor=1/GetTouchscreenContactPointCount( );
257 setting_value=RangeConversion(rotation_angle, factor);
258 Display "setting_value" in labeling field of the tab;
259 Touchscreen event "contact end" ?
260 Trigger gesture event "turn-setting end"; parameter: "setting_value";
261 Hide animated circle and adjacent tab; display final "setting_value";

The invention claimed is:

1. A method for the recognition of gesture sequences consisting of at least one gesture part, comprising:
a) providing a portable electronic device with at least one sensor device comprising an accelerometer, a gyroscope, a magnetometer, or a combination thereof, and with at least one touch-sensitive surface that is able to detect at least one finger,
b) processing values captured at least in part by said sensor device, at least as soon as said touch-sensitive surface detects a relevant input by said at least one finger,
c) discerning
gesture parts based on moving said portable electronic device while said at least one finger remains substantially unmoved
from
gesture parts based on changing position of said at least one finger while said portable electronic device remains substantially unmoved,
and
d) invoking an assigned function in case a gesture sequence is recognized.

2. The method of claim 1, further comprising continually buffering of at least a part of the values captured by said sensor device in a buffer, such that said buffer always contains the values of a period of time from the recent past up until to the present, accessing the values stored in said buffer as soon as said touch-sensitive surface detects a relevant input by said finger.

3. The method of claim 1, wherein at least a part of the values captured by said sensor device are evaluated to distinguish by means of a decision criterion whether said portable electronic device is moving or substantially unmoved at least at a time point in the temporal proximity of a relevant input by said finger, the input being detected by said touch-sensitive surface.

4. The method of claim 3, further comprising:
a) determining the velocity of said portable electronic device by integrating the acceleration measured by said accelerometer,
b) evaluating the velocity of said portable electronic device taken at least from a time point shortly before the beginning of contact or shortly after the end of contact, said contact being detected by said touch-sensitive surface.

5. The method of claim 1, further comprising a decision criterion that evaluates whether the movement of said portable electronic device takes place in a direction approximately perpendicular to said touch-sensitive surface.

6. The method of claim 1, further comprising the steps of:
a) touching said touch-sensitive surface with said finger while holding said portable electronic device substantially steady in place, the beginning of contact being detected by said touch-sensitive surface;
b) keeping the current position of said finger in a steady manner;
c) moving said portable electronic device approximately perpendicularly to said touch-sensitive surface, in the direction of the rear side of said touch-sensitive surface, away from said substantially unmoved finger, the end of contact being detected by said touch-sensitive surface;
d) stopping the movement of said portable electronic device after reaching a distance;
e) invoking an assigned function, at the latest, after stopping said portable electronic device.

7. The method of claim 6, further comprising:
a) determining, at least in part by means of said sensor device, a distance from the change in position of said portable electronic device between said end of contact detected by said touch-sensitive surface and the end of the movement of said portable electronic device,
b) handing over an input parameter derived at least in part from said distance.

8. The method of claim 1, further comprising the steps of:
a) holding said finger substantially steady in place at a distance apart from said touch-sensitive surface;
b) moving said portable electronic device approximately perpendicularly to said touch-sensitive surface, in the direction of the front side of said touch-sensitive surface, toward said substantially unmoved finger until said touch-sensitive surface touches said substantially unmoved finger, the beginning of contact being detected by said touch-sensitive surface;
c) removing said finger from said touch-sensitive surface while holding said portable electronic device substantially steady in place, the end of contact being detected by said touch-sensitive surface;
d) invoking an assigned function.

9. The method of claim 8, further comprising:
a) determining, at least in part by means of said sensor device, a distance from the change in position of said portable electronic device between the beginning of the movement of said portable electronic device and said beginning of contact detected by said touch-sensitive surface,
b) handing over an input parameter derived at least in part from said distance.

10. The method of claim 1, further comprising the steps of:
a) holding said finger substantially steady in place at a distance apart from said touch-sensitive surface;
b) moving said portable electronic device approximately perpendicularly to said touch-sensitive surface, in the direction of the front side of said touch-sensitive surface, toward said substantially unmoved finger until said touch-sensitive surface touches said substantially unmoved finger, the beginning of contact being detected by said touch-sensitive surface;
c) keeping the current position of said finger in a steady manner;
d) moving said portable electronic device approximately perpendicularly to said touch-sensitive surface, in the direction of the rear side of said touch-sensitive surface, away from said substantially unmoved finger, the end of contact being detected by said touch-sensitive surface;
e) stopping the movement of said portable electronic device after reaching a distance;
f) invoking an assigned function, at the latest, after stopping said portable electronic device.

11. The method of claim 10, further comprising:
a) determining, at least in part by means of said sensor device, at least
   i) a first distance from the change in position of said portable electronic device between the beginning of the movement of said portable electronic device and said beginning of contact detected by said touch-sensitive surface, or
   ii) a second distance from the change in position of said portable electronic device between said end of contact detected by said touch-sensitive surface and the end of the movement of said portable electronic device,
b) handing over at least one input parameter derived at least in part from said first distance, said second distance, or a combination thereof.

12. The method of claim 1, wherein at least one setting value is adjustable in a first and second direction, comprising:
a) changing said setting value in the first direction by keeping said finger substantially unmoved at a distance apart from said touch-sensitive surface, and subsequently moving said portable electronic device toward said substantially unmoved finger until said touch-sensitive surface touches said substantially unmoved finger, or
b) changing said setting value in the second direction by touching said touch-sensitive surface with said finger while keeping said portable electronic device substantially unmoved, and subsequently moving said portable electronic device away from said finger while keeping said finger substantially unmoved such that said substantially unmoved finger loses contact with said touch-sensitive surface.

13. The method of claim 12, further comprising changing said setting value in dependence on a distance derived from the change in position of said portable electronic device, said distance being determined at least in part by means of said sensor device.

14. The method of claim 12, wherein said setting value controls at least in part:
a) the zoom-level of content displayed on a display,
b) the size of content displayed on a display,
c) the scale of content displayed on a display,
d) the brightness of content displayed on a display, or
e) a combination thereof.

15. The method of claim 1, wherein an onscreen keyboard is displayed on said touch-sensitive surface and wherein, proceeding from a pressed key on said onscreen keyboard, a lowercase letter is entered, in case said portable electronic device is kept substantially unmoved while removing said finger from said pressed key and otherwise, proceeding from said pressed key, an uppercase letter is entered, in case said portable electronic device is moved away from the substantially unmoved finger, essentially in the direction of the rear side of said touch-sensitive surface, terminating contact with said pressed key.

16. The method of claim 1, further comprising a decision criterion that evaluates whether the movement of said portable electronic device takes place approximately in the plane of said touch-sensitive surface.

17. The method of claim 1, further comprising:
a) providing contact of said finger with said touch-sensitive surface,
b) keeping said finger substantially unmoved,
c) shifting said portable electronic device below said substantially unmoved finger essentially in the plane of said touch-sensitive surface, while maintaining contact with said substantially unmoved finger, such that said substantially unmoved finger slides over said touch-sensitive surface.

18. The method of claim 17, further comprising:
a) determining the velocity of said portable electronic device by integrating the acceleration measured by said accelerometer,
b) evaluating the velocity of said portable electronic device taken at least from a time point at which a moving contact point is detected by said touch-sensitive surface.

19. The method of claim 17, further comprising a decision criterion that evaluates whether the direction of a moving contact point, detected by said touch-sensitive surface, and the direction of the movement of said portable electronic device, detected at least in part by said sensor device, are approximately pointing in opposite directions.

20. The method of claim 17, further comprising a decision criterion that evaluates to what extent the speed of a moving contact point, measured by said touch-sensitive surface, and the velocity of said portable electronic device, measured at least in part by said sensor device, suit each other, a tolerance being permitted.

21. The method of claim 1, further comprising the steps of:
a) touching said touch-sensitive surface with said finger, the beginning of contact being detected by said touch-sensitive surface;
b) keeping said finger substantially unmoved;
c) shifting said portable electronic device below said substantially unmoved finger essentially in the plane of said touch-sensitive surface while maintaining contact between said substantially unmoved finger and said touch-sensitive surface;
d) removing said finger from said touch-sensitive surface while said portable electronic device is in full motion, the end of contact in full motion being detected by said touch-sensitive surface;
e) invoking an assigned function.

22. The method of claim 1, further comprising the steps of:
a) touching said touch-sensitive surface with said finger, the beginning of contact being detected by said touch-sensitive surface;
b) keeping said finger substantially unmoved;
c) shifting said portable electronic device below said substantially unmoved finger essentially in the plane of said touch-sensitive surface beyond the edge of said touch-sensitive surface such that said substantially unmoved finger loses contact with said touch-sensitive surface at the edge, the end of contact in full motion being detected by said touch-sensitive surface;
d) invoking an assigned function.

23. The method of claim 1, wherein said portable electronic device is a wrist-worn electronic device, and wherein said touch-sensitive surface is curved at least in part around a forearm, said wrist-worn electronic device being operated by the steps of:
a) touching said touch-sensitive surface with said finger, the beginning of contact being detected by said touch-sensitive surface;
b) keeping said finger substantially unmoved;
c) twisting said forearm below said substantially unmoved finger while maintaining contact, such that said substantially unmoved finger slides over said touch-sensitive surface;
d) measuring the rotation of said forearm at least in part by means of said sensor device;
e) stopping the rotation of said forearm;
f) removing said finger from said touch-sensitive surface, the end of contact being detected by said touch-sensitive surface;
g) invoking an assigned function at least in case the angle of rotation between said beginning of contact and said end of contact meets a decision criterion, or invoking an assigned function at least in case the speed of the rotation meets a decision criterion.

24. The method of claim 23, further comprising a decision criterion that evaluates to what extent the speed of a moving contact point, measured by said touch-sensitive surface, and the rotational speed of said portable electronic device, measured at least in part by said sensor device, suit each other, a tolerance being permitted.

25. The method of claim 1, further comprising the steps of:
a) touching said touch-sensitive surface with said finger, the beginning of contact being detected by said touch-sensitive surface;
b) rotating said portable electronic device below the substantially unmoved finger around a rotation axis approximately perpendicular to said touch-sensitive surface while maintaining contact, the contact point of said finger on said touch-sensitive surface constituting the pivot point;
c) increasing or decreasing an adjustable value or changing a property in dependence on the rotation around said rotation axis, the rotation being measured at least in part by said sensor device;
d) retaining the last adjusted value or the new configuration of said property at the latest when said finger is removed from said touch-sensitive surface, the end of contact being detected by said touch-sensitive surface.

26. The method of claim 25, wherein an additional contact point of an additional finger, detected by said touch-sensitive surface, results in a modification of the conversion ratio between the rotation of said portable electronic device around said rotation axis and said adjustable value or property.

27. The method of claim 25, wherein the area of said touch-sensitive surface that allows the modification of said adjustable value or property is visualized by means of a display at least as:
a) a control dial, the rotation of said portable electronic device around said rotation axis resulting in changes to the pointer position of said control dial,
b) a circle surrounding said pivot point, the rotation of said portable electronic device around said rotation axis resulting in changes to the size of said circle,
c) a color-selection element, the rotation of said portable electronic device around said rotation axis resulting in changes to the selected color, or
d) a numeric value, the rotation of said portable electronic device around said rotation axis resulting in changes to the value.

28. The method of claim 25, further comprising an over-wind protection that, in case an upper or lower limit of said adjustable value or property is exceeded as the result of the rotation of said portable electronic device around said rotation axis, rotates at least a part of the screen content, visualized on said touch-sensitive surface by means of a display, by an angle opposite to the over-rotation determined at least in part by said sensor device, such that the opposite rotation angles offset each other.

29. The method of claim 1, wherein, as soon as the beginning of contact of said finger is detected by said touch-sensitive surface, the rotation of said portable electronic device around a rotation axis approximately perpendicular to said touch-sensitive surface is monitored at least in part by means of said sensor device, and if the angle of rotation since the beginning of contact exceeds a threshold value, a first assigned function is invoked or a value or property is changed, and otherwise, if till the end of contact the angle of rotation remains below said threshold value, a second assigned function is invoked.

30. The method of claim 1, wherein a first assigned function is invoked in case said touch-sensitive surface detects a single finger and wherein at least a second assigned function is invoked in case said touch-sensitive surface detects two fingers.

31. The method of claim 1, wherein said at least one finger is a thumb or a stylus, said thumb or said stylus being detected as an input by said touch-sensitive surface.

32. The method of claim 1, wherein:
   a) said sensor device comprises at least two different sensors that are measuring different physical properties, the measurements of the sensors being combined such that the accuracy is increased,
   b) said touch-sensitive surface is a touchscreen,
   c) said assigned function is a gesture event, causes an action, changes a value, changes a property, or a combination thereof.

33. The method of claim 1, wherein said assigned function involves at least one of the following tasks:
   a) aborting or suspending a running process or operation,
   b) undoing an action,
   c) deleting an element or object,
   d) changing or sorting the order of elements, objects, pages, cards, or tabs,
   e) locking or unlocking the scroll capability of a page, card, or tab,
   f) terminating a running application program,
   g) switching between application programs,
   h) minimizing or maximizing a running application program,
   i) moving a running application program to the background or foreground,
   j) returning to a main menu or home screen,
   k) executing a search function,
   l) displaying an input screen for a search function,
   m) entering an uppercase letter,
   n) accepting a word or text suggested by an auto-complete function,
   o) taking a telephone call,
   p) terminating a telephone call,
   q) enabling or disabling a lock screen,
   r) jumping to the next or previous paragraph, page, or chapter of a text or document,
   s) jumping to the beginning or end of a text or document,
   t) leaping forward or backward during the playback of an audio or video recording,
   u) skipping the current, the next, or the previous recording in a playlist,
   v) setting a volume or a brightness,
   w) rotating the screen content or an object displayed on a display.

34. A portable electronic device for recognizing gesture sequences consisting of at least one gesture part, comprising:
   a) at least one sensor device selected from the group consisting of accelerometers, gyroscopes, magnetometers, and combinations thereof,
   b) at least one touch-sensitive surface that is able to detect at least one input object, and
   c) a control unit configured or programmed to:
      i) determine an input caused by at least one input object, said input being detected by said touch-sensitive surface,
      ii) process values captured at least in part by said sensor device
         to discern
            gesture parts that are based on the motion of said portable electronic device while said at least one input object remains substantially unmoved
         from
            gesture parts that are based on the change in position of said at least one input object while said portable electronic device remains substantially unmoved,
         and
      iii) invoke an assigned function in case a gesture sequence is recognized.

35. The portable electronic device of claim 34, wherein the motion of said portable electronic device involves:
   a) to move said portable electronic device toward or away from said substantially unmoved input object,
   b) to shift said portable electronic device below said substantially unmoved input object,
   c) to rotate said portable electronic device below said substantially unmoved input object, or
   d) a combination thereof.

36. The portable electronic device of claim 34, wherein the motion of said portable electronic device involves to shift said portable electronic device below said substantially unmoved input object essentially in the plane of said touch-sensitive surface beyond the edge of said touch-sensitive surface such that said substantially unmoved input object, which slides over said touch-sensitive surface, loses contact with said touch-sensitive surface at the edge.

37. The portable electronic device of claim 34, wherein said portable electronic device is a wrist-worn electronic device, said touch-sensitive surface being curved at least in part around a forearm, and wherein the motion of said wrist-worn electronic device involves to twist said forearm below said substantially unmoved input object while maintaining contact between said input object and said touch-sensitive surface, such that said substantially unmoved input object slides over said touch-sensitive surface.

38. The portable electronic device of claim 34, wherein the motion of said portable electronic device involves to rotate said portable electronic device below said substantially unmoved input object around a rotation axis approximately perpendicular to said touch-sensitive surface, the pivot point of said rotation axis on said touch-sensitive surface being located in the region in which said substantially unmoved input object is sliding on said touch-sensitive surface.

39. The portable electronic device of claim 34, wherein said control unit further is configured or programmed to recognize a gesture sequence comprising at least the following successive steps:
   a) to touch said touch-sensitive surface with said input object while said portable electronic device remains substantially unmoved;
   b) to move said portable electronic device while said input object remains substantially unmoved.

40. The portable electronic device of claim 34, wherein:
   a) said touch-sensitive surface is a touchscreen,
   b) said control unit further is configured or programmed to determine that at least one input object is touching said touchscreen while said portable electronic device is rotated below said substantially unmoved input object around a rotation axis approximately perpendicular to said touchscreen, the pivot point of said rotation axis on said touchscreen being located in the region in which said substantially unmoved input object is sliding on said touchscreen, c) said assigned function involves to change at least a property or the orientation of the screen content displayed on said touchscreen.

41. The portable electronic device of claim 34, wherein said assigned function has a different behavior depending on the number of input objects detected by said touch-sensitive surface.

42. The portable electronic device of claim 34, wherein:

a) said sensor device is a interconnection of at least two different sensors that are measuring different physical properties, the measurements of the sensors being combined such that the accuracy is increased, b) said touch-sensitive surface is a touchscreen, c) said at least one input object is selected from the group consisting of fingers, thumbs, styluses, and combinations thereof, d) said assigned function is a gesture event, causes an action, changes a value, changes a property, or a combination thereof.

43. The portable electronic device of claim 34, wherein said assigned function involves at least one of the following tasks:

a) to abort or suspend a running process or operation,
b) to undo an action,
c) to delete an element or object,
d) to change or sort the order of elements, objects, pages, cards, or tabs,
e) to lock or unlock the scroll capability of a page, card, or tab,
f) to terminate a running application program,
g) to switch between application programs,
h) to minimize or maximize a running application program,
i) to move a running application program to the background or foreground,
j) to return to a main menu or home screen,
k) to execute a search function,
l) to display an input screen for a search function,
m) to enter an uppercase letter,
n) to accept a word or text suggested by an auto-complete function,
o) to take a telephone call,
p) to terminate a telephone call,
q) to enable or disable a lock screen,
r) to jump to the next or previous paragraph, page, or chapter of a text or document,
s) to jump to the beginning or end of a text or document,
t) to leap forward or backward during the playback of an audio or video recording,
u) to skip the current, the next, or the previous recording in a playlist,
v) to set a volume or a brightness,
w) to rotate the screen content or an object displayed on a display.

* * * * *